(12) United States Patent  
Givon

(10) Patent No.: US 8,114,172 B2  
(45) Date of Patent: Feb. 14, 2012

(54) SYSTEM AND METHOD FOR 3D SPACE-DIMENSION BASED IMAGE PROCESSING

(75) Inventor: Dor Givon, Tel-Aviv (IL)

(73) Assignee: Extreme Reality Ltd., Herzliya (IL)

(*) Notice: Subject to any disclaimer, the term of this patent is extended or adjusted under 35 U.S.C. 154(b) by 4 days.

(21) Appl. No.: 11/572,958

(22) PCT Filed: Jul. 31, 2005

(86) PCT No.: PCT/IL2005/000813
§ 371 (c)(1),
(2), (4) Date: Jan. 30, 2007

(87) PCT Pub. No.: WO2006/011153
PCT Pub. Date: Feb. 2, 2006

(65) Prior Publication Data
US 2008/0037829 A1    Feb. 14, 2008

(51) Int. Cl.
*H04N 7/00* (2011.01)
*G06K 9/00* (2006.01)
(52) U.S. Cl. .......................... 48/49; 382/128
(58) Field of Classification Search .......... 348/49; 378/4; 382/128, 300; 345/441, 467, 474, 345/473
See application file for complete search history.

(56) References Cited

U.S. PATENT DOCUMENTS

| | | | |
|---|---|---|---|
| 5,831,633 A * | 11/1998 | Van Roy | 345/441 |
| 6,243,106 B1 | 6/2001 | Rehg | |
| 6,317,130 B1 * | 11/2001 | Ishikawa et al. | 345/473 |
| 6,388,670 B2 * | 5/2002 | Naka et al. | 345/474 |
| 6,529,643 B1 * | 3/2003 | Loce et al. | 382/300 |
| 6,674,877 B1 | 1/2004 | Jojic et al. | |
| 7,061,492 B2 * | 6/2006 | Carrai et al. | 345/467 |
| 7,116,330 B2 * | 10/2006 | Marshall et al. | 345/474 |
| 7,366,278 B2 * | 4/2008 | Fu et al. | 378/4 |
| 2005/0041842 A1 * | 2/2005 | Frakes et al. | 382/128 |

FOREIGN PATENT DOCUMENTS

WO    WO 03/039698    5/2003

OTHER PUBLICATIONS

Molet et al. "An animation interface designed for motion capture" Computer Animation '97 Geneva, Switzerland, XP010227324; pp. 77-85; ISBN 978-0-8186-7984-1.
Kronrod B. et al. "Optimized triangle mesh compression using prediction trees"; Computer Graphics and Applications, 2000. XP010523037; ISBN 978-0-7695-0868-9; pp. 406-407.

(Continued)

*Primary Examiner* — Gims Philippe
(74) *Attorney, Agent, or Firm* — Vladimir Sherman; Professional Patent Solutions

(57) ABSTRACT

An apparatus for 3D representation of image data, comprising: a structure identifier for identifying structures in motion within image data, and a skeleton insertion unit, which associates three-dimensional skeleton elements with the identified structures. The skeleton elements are able to move with the structures to provide a three-dimensional motion and structural understanding of said image data which can be projected back onto the input data. As well as individual elements, complex bodies can be modeled by complex skeletons having multiple elements. The skeleton elements themselves can be used to identify the complex objects.

15 Claims, 16 Drawing Sheets

OTHER PUBLICATIONS

Theobolt C. et al.; "Enhancing silhouette-based human motion capture with 3D motion fields" Computer Graphics and Applications, 2003. Proceedings. pp. 185-193, XP 010662468.

Carranza et al.: "Free-Viewpoint Video of Human Actors"; Proc. of ACM Siggraph 2003; pp. 569-577; XP040167377.

Cheung G K M et al.: "Shape-from-Silhouette of Articulated Objects and Its Use for Human Body Kinematics Estimation and Motion Capture"; 2003, pp. 77-84; XP010644884.

Starck et al.: "Model-based multiple view reconstruction of people"; Oct. 13, 2003; pp. 915-922 vol. 2, XP031213144, ISBN 978-0-7695-1950-0.

Extended Search Report of European Patent Application No. 05763283.8.

* cited by examiner

SYSTEM AND METHOD FOR 3D SPACE-DIMENSION BASED IMAGE PROCESSING

FIELD AND BACKGROUND OF THE INVENTION

The present invention relates to photography, image processing and animation, and more particularly, but not exclusively to three dimensional (3D) photography, three dimensional image processing and three dimensional animation.

The present art in three-dimensional photography is based on the time dimension.

The present invention relates to several different fields that belong to the world of 3D imagery and image processing, for example: Stereoscopic images, spherical photographing systems, 3D computer animation, 3D photography, and 3D image processing algorithms.

Conventional 3D-stereoscopic photographing employs twin cameras having parallel optical axes and a fixed distance between their aligned lenses. These twin cameras produce a pair of images which can be displayed by any of the known in the art techniques for stereoscopic displaying and viewing. These techniques are based, in general, on the principle that the image taken by a right lens is displayed to the right eye of a viewer and the image taken by the left lens is displayed to the left eye of the viewer.

For example, U.S. Pat. No. 6,906,687, assigned to Texas Instruments Incorporated, entitled "Digital formatter for 3-dimensional display applications" discloses a 3D digital projection display that uses a quadruple memory buffer to store and read processed video data for both right-eye and left-eye display. With this formatter video data is processed at a 48-frame/sec rate and readout twice (repeated) to provide a flash rate of 96 (up to 120) frames/sec, which is above the display flicker threshold. The data is then synchronized with a headset or goggles with the right-eye and left-eye frames being precisely out-of-phase to produce a perceived 3-D image.

Spherical or panoramic photographing is traditionally done either by a very wide-angle lens, such as a "fish-eye" lens, or by "stitching" together overlapping adjacent images to cover a wide field of vision, up to fully spherical fields of vision. The panoramic or spherical images obtained by using such techniques can be two dimensional images or stereoscopic images, giving to the viewer a perception of depth. These images can also be computed three dimensional (3D) images in terms of computing the distance of every pixel in the image from the camera using known in art methods such as triangulation methods.

For example, U.S. Pat. No. 6,833,843, assigned to Tempest Microsystems Incorporated, teaches an image acquisition and viewing system that employs a fish-eye lens and an imager such as, a charge coupled device (CCD), to obtain a wide angle image, e.g., an image of a hemispherical field of view.

Reference is also made to applicant's co-pending U.S. patent application Ser. No. 10/416,533 filed Nov. 28, 2001, the contents of which are hereby incorporated by reference. The application teaches an imaging system for obtaining full stereoscopic spherical images of the visual environment surrounding a viewer, 360 degrees both horizontally and vertically. Displaying the images by means suitable for stereoscopic displaying, gives the viewers the ability to look everywhere around them, as well as up and down, while having stereoscopic depth perception of the displayed images. The disclosure teaches an array of cameras, wherein the lenses of the cameras are situated on a curved surface, pointing out from C common centers of said curved surface. The captured images are arranged and processed to create sets of stereoscopic image pairs, wherein one image of each pair is designated for the observer's right eye and the second image for his left eye, thus creating a three dimensional perception.

3D computer animation relates to the field of "Virtual Reality", that has gained popularity in recent years. 3D Virtual reality is constructed from real images, with which synthetically made images can be interlaced in. There also exists fully computer generated Virtual reality. 3D virtual reality demands 3D computation of the photographed image to create the 3D information of the elements being shot.

This can be done in real time using active methods.

For example, 3DV systems Incorporated provides the ZCam™ camera which captures, in real time, the depth value of each pixel in the scene in addition to the color value, thus creating a depth map for every frame of the scene by grey level scaling of the distances. The Zcam™ camera is a uniquely designed camera which employs a light wall having a proper width. The light wall may be generated, for example, as a square laser pulse. As the light wall hits objects in a photographed scene it is reflected towards the ZCam™ camera carrying an imprint of the objects. The imprint carries all the information required for the reconstruction of the depth map.

3D computation of photographed images may also be provided using passive methods.

Passive methods for depth construction may use triangulation techniques that make use of at least two known scene viewpoints. Corresponding features are identified, and rays are intersected to find the 3D position of each feature. Space-time stereo adds a temporal dimension to the neighborhoods used in the spatial matching function. Adding temporal stereo, using multiple frames across time, we match a single pixel from the first image against the second image. This can also be done by matching space-time trajectories of moving objects, in contrast to matching interest points (corners), as done in regular feature-based image-to-image matching techniques. The sequences are matched in space and time by enforcing consistent matching of all points along corresponding space-time trajectories, also obtaining sub-frame temporal correspondence (synchronization) between two video sequences.

3D computer generated images (CGI) is a virtual world, a designated area, created using 3D computer generated images software. The virtual world is created in a designated area where every point in the virtual world is a computer generated point. 2D or 3D real images may also be interlaced in this virtual world.

Reference is now made to FIG. 1 which illustrates a virtual world, according to techniques known in the art.

The 3D position of every point in this virtual world is known. Adding to certain points in the space details such as color, brightness and so on, creates shapes in space (FIG. 1). Introducing a virtual camera into this world enables to create time based sequences in the virtual world, to create stereo images, and so on.

We can synchronize between photographed images and the computer generated world using space synchronization, and then time synchronization, fitting real world images in the virtual world in spatial and temporal terms.

Reference is now made to FIG. 2 which shows a prior art virtual studio.

In this example we use a virtual studio where the camera enables to create separation between a human figure and its background, in a technique which is known in art as blue/ green screen. Isolating the human figure from its surrounding we can interlace the figure in the virtual world created in a computer, as shown in FIG. 3.

The very opposite thing can also be done by monitoring a set of cameras in a pre-determined space such as a basketball field, where known fixed points are pre determined, and synchronized fix points are created in a computer generated 3D world. With such a technique, we can isolate a CGI figure and interlace it in the basketball field. For example, ORAD Incorporated CyberSport™ product provides for live insertion of tied-to-the-field 3D graphics for sport events taking place in a basketball field, a football field, and the like, creating the illusion that the inserted graphic objects are integral parts of the event.

As described above, traditional methods and systems for 3D imaging and stereoscopic photography are based on special cameras, special lenses, predetermined positioning of two or more cameras and dedicated algorithms.

There is thus a widely recognized need for, and it would be highly advantageous to have a system and method for photography and imaging

SUMMARY OF THE INVENTION

According to one aspect of the present invention there is provided apparatus for 3D representation of image data, the apparatus comprising:
a structure identifier for identifying structures in motion within said image data, and
a skeleton insertion unit, associated with said structure identifier, for associating three-dimensional skeleton elements with said structures, such that said skeleton elements are able to move with said structures to provide a three-dimensional motion and structural understanding of said image data.

According to a second aspect of the present invention there is provided a method for 3D representation of image data, comprising:
identifying structures within said image data, and
associating three-dimensional skeleton elements with said structures, such that said skeleton elements are able to move with said structures to provide a three-dimensional understanding of said structures.

According to a third aspect of the present invention there is provided a recording apparatus for recording input data with depth information, comprising:
a structure identifier for identifying structures in motion within said image data,
a skeleton insertion unit, associated with said structure identifier, for associating three-dimensional skeleton elements with said structures, such that said skeleton elements are able to move with said structures to provide a three-dimensional motion and structural understanding of said image data, and
a storage unit for recording said input data in relation to at least one of said skeleton elements and a background.

According to a fourth aspect of the present invention there is provided compression apparatus for compressing input data with depth information, comprising:
a structure identifier for identifying structures in motion within said image data,
a skeleton insertion unit, associated with said structure identifier, for associating three-dimensional skeleton elements with said structures, such that said skeleton elements are able to move with said structures to provide a three-dimensional motion and structural understanding of said image data, and
a compression unit for outputting said input data in relation to at least one of said skeleton elements and a background, such as to provide compression of said input data and to provide depth information thereof.

According to a fifth aspect of the present invention there is provided a recording method for recording input data with depth information, comprising:
identifying structures in motion within said image data,
associating three-dimensional skeleton elements with said structures, such that said skeleton elements are able to move with said structures to provide a three-dimensional motion and structural understanding of said image data, and
recording said input data in relation to at least one of said skeleton elements and a background.

According to a sixth aspect of the present invention there is provided a compression method for compressing input data with depth information, comprising:
identifying structures in motion within said image data,
associating three-dimensional skeleton elements with said structures, such that said skeleton elements are able to move with said structures to provide a three-dimensional motion and structural understanding of said image data, and
outputting said input data in relation to at least one of said skeleton elements and a background, such as to provide compression of said input data and to provide depth information thereof.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
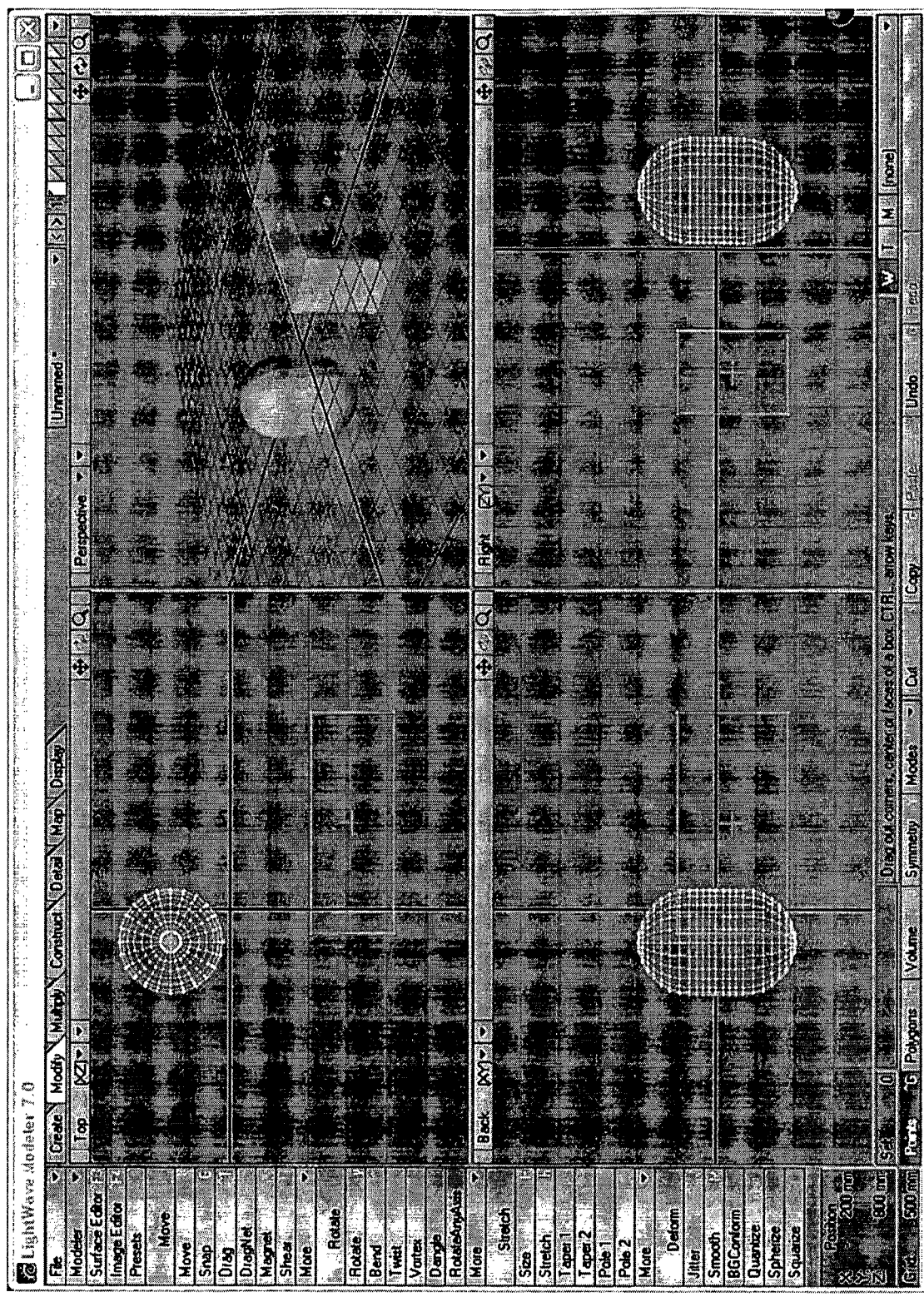
FIG. 1 is a photograph of prior art 3D computer generated virtual figures.
Figure 2A:
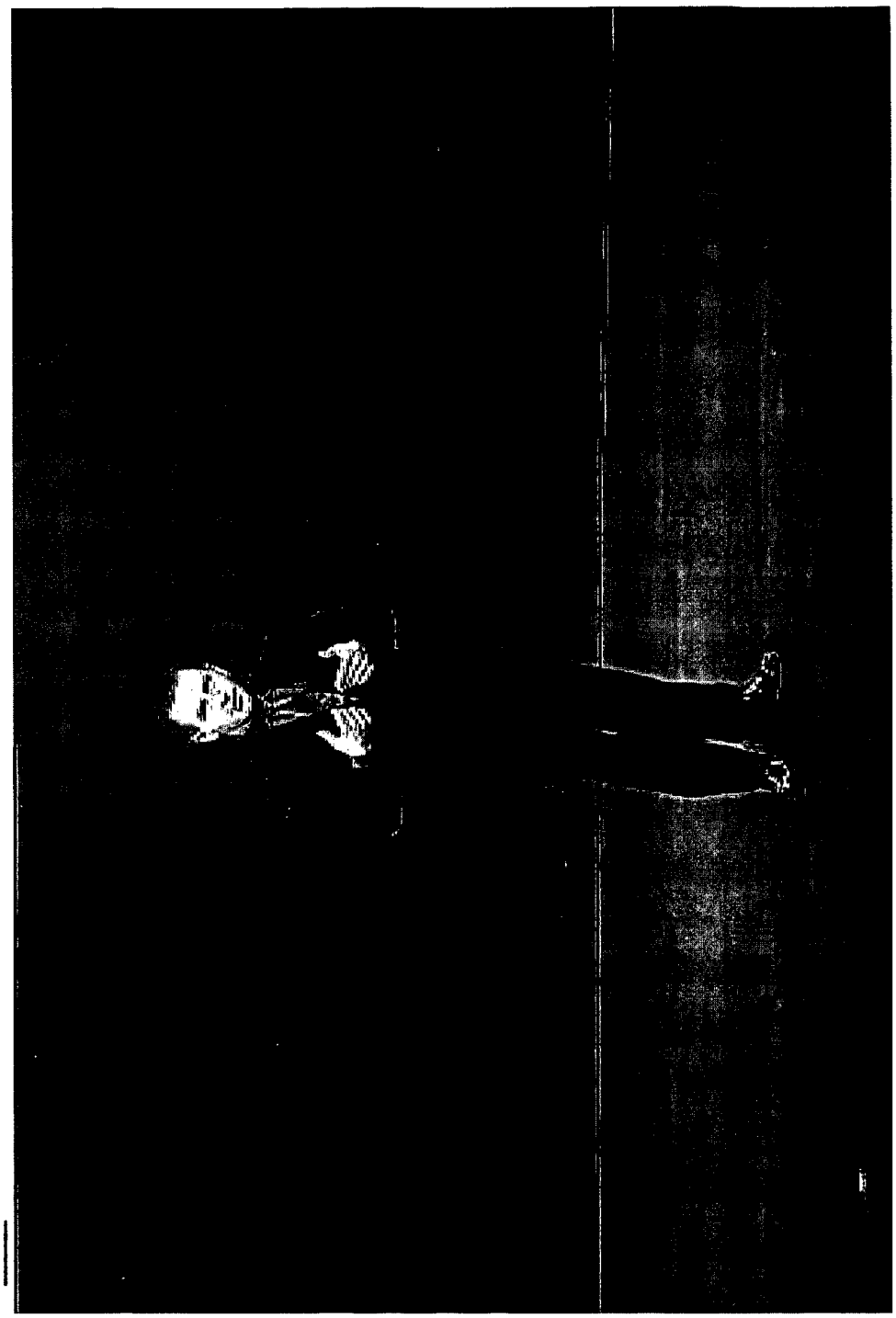
FIG. 2a is a first photograph of a prior art virtual studio.
Figure 2B:
FIG. 2b is a second photograph of a prior art virtual studio.

The present embodiments comprise a method and an apparatus for transforming time based sequences of photographed images into space based three dimensional (3D) models, enabling real-time and non real-time applications such as 3D real image animation, new time based sequences, image processing manipulations, 2D/3D motion capture and so on.

The present embodiments identify structures within two-dimensional or partial three-dimensional data and associate three-dimensional skeleton or skeleton elements therewith. The skeleton or skeleton elements may be applied at a separate level from the original data, allowing the levels to be projected onto each other to provide accurate depth information to the image data.

The principles and operation of a method and apparatus according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 3:
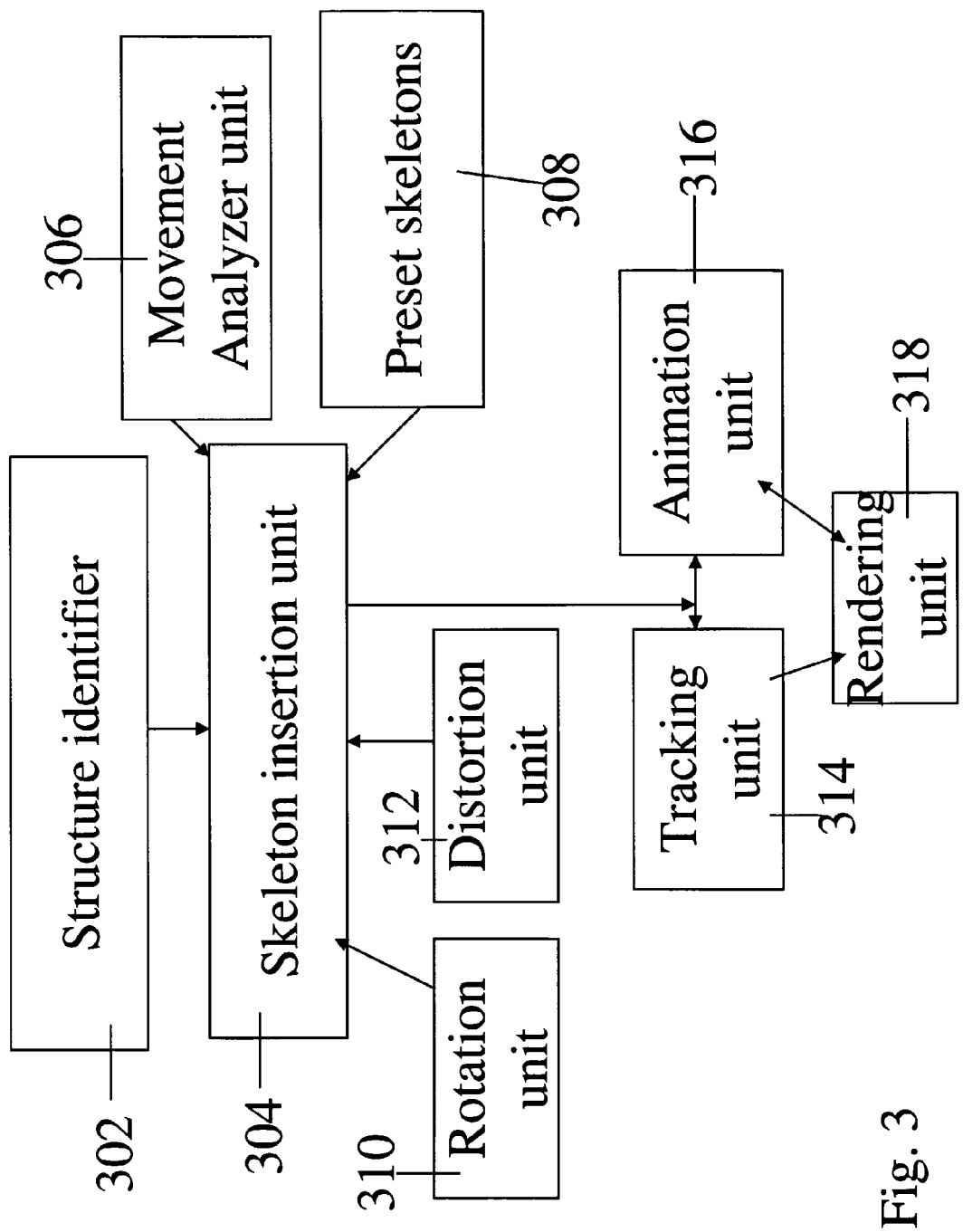
FIG. 3 is a simplified block diagram of an apparatus for 3D image analysis according to a first preferred embodiment of the present invention.

Reference is now made to FIG. 3, which is a simplified block diagram illustrating an apparatus for providing a three-dimensional understanding to image data. The image data may be two-dimensional or partial three-dimensional information, and the understanding is a unified understanding of three-dimensional structures and three-dimensional motion.

The apparatus of FIG. 3 comprises a structure identifier 302 for identifying structures within the image data. As will be discussed in greater detail below the structures may be identified automatically using artificial intelligence or they may be identified with the help of user input, or a combination of both.

The apparatus further comprises a skeleton insertion unit 304, associated with said rigid structure identifier, which associates or attaches three-dimensional skeleton elements with the structures identified in the image data. The skeleton elements may be blocks, tubes, spheres, ovals, or any other elemental or more complex three-dimensional geometric entities, the elements have the ability to add joints to themselves and attach to each other. The three-dimensional shape of the element is imparted to the structure identified as above and the skeleton element is now able to move or otherwise coexist with the structures to provide a three-dimensional understanding of the structure.

That is to say the skeleton element has a known three-dimensional structure, meaning it extends in the X, Y and Z dimensions. The structure's movement can be seen in the X and Y dimensions, and details of the structure's behavior in the Z dimension can be inferred from its association with the skeleton element.

The structure identifier is preferably able to recognize not just individual structures but also complex bodies made up of interrelated structures, interrelated meaning that they have defined movement relations between them. An example is the human body, which consists of structures such as the forearm and the upper arm. The forearm pivots on the end of the upper arm in a defined manner, which can be modeled by the skeleton elements of the present embodiments.

In the event that such a complex body is recognized from the image data, the skeleton insertion unit attempts to construct a correspondingly complex skeleton in which movement relations between the skeleton elements are defined as for the complex body. As will be explained below, one way to achieve this is to recognize the complex body, say as a human and have preset skeletons with the necessary elements and relationships preprogrammed in.

Using such prestored or preset skeletons, the three-dimensional aspects of the complex body, including both structure and motion can be understood. That is to say three-dimensional structure and motion within the image can be understood from a priori knowledge of an identified body. Furthermore, if the depth information for the object is known within the system, based on the skeleton, then the processing load for three-dimensional processing of the image may be significantly reduced.

The apparatus may further comprise a movement analyzer unit 306 which may analyze relative movement within the original image data to provide movement relation definitions for the skeleton insertion unit 304. The movement analyzer is able to recognize structures within the mass of pixels that make up the image and to identify movement among groups of pixels, using tracking techniques that are known in the art.

A skeleton store 308 stores preset skeletons for use with recognized complex bodies. The store may for example store a preset skeleton for a human, which is used every time a human is recognized in the image data.

Assuming the structure is not recognized as having a preset skeleton. Then the skeleton insertion unit attempts to form a skeleton from scratch by inserting geometric elements. However the geometric elements may need to be rotated and distorted before they fit. There is thus provided a rotation unit, 310 which allows the selected element to be rotated until it fits the image data, and a distortion unit 312 which allows the element to be distorted in various ways to fit the data. The rotation and distortion units may be operated through user input or may operate automatically.

Having fitted the skeleton the structures within the image are now modeled as three-dimensional models. A tracking unit 314 can track movement within the initial image data and move the skeleton with the image so that three-dimensional information of the motion is available. A process of projecting between the skeleton and the image data can be carried out, and it is possible thereby to obtain three-dimensional and movement information from a single camera.

An animation unit 316 allows movement to be applied via the skeleton so that a figure or other object once modeled can be animated.

It will be appreciated that depending on the application, the apparatus will not necessarily have both the tracking unit and the animation unit. An animation application would typically have the animation unit but may dispense with the tracking unit, whereas a video capture application may have a tracking unit and dispense with the animation unit.

Rendering unit 318 is connected to either or both of the tracking unit and animation unit and renders a scene being modeled for viewing from a requested direction. That is to say, the advantage of having the 3D data is that the modeled objects etc can be viewed from any angle and not just the angle in which an image may have been initially taken. The rendering unit simply needs to make a projection of the three-dimensional model onto a plane in the requested viewing direction, apply texture etc as will be explained in greater detail below, and the scene can be viewed from the given direction.

Figure 4:
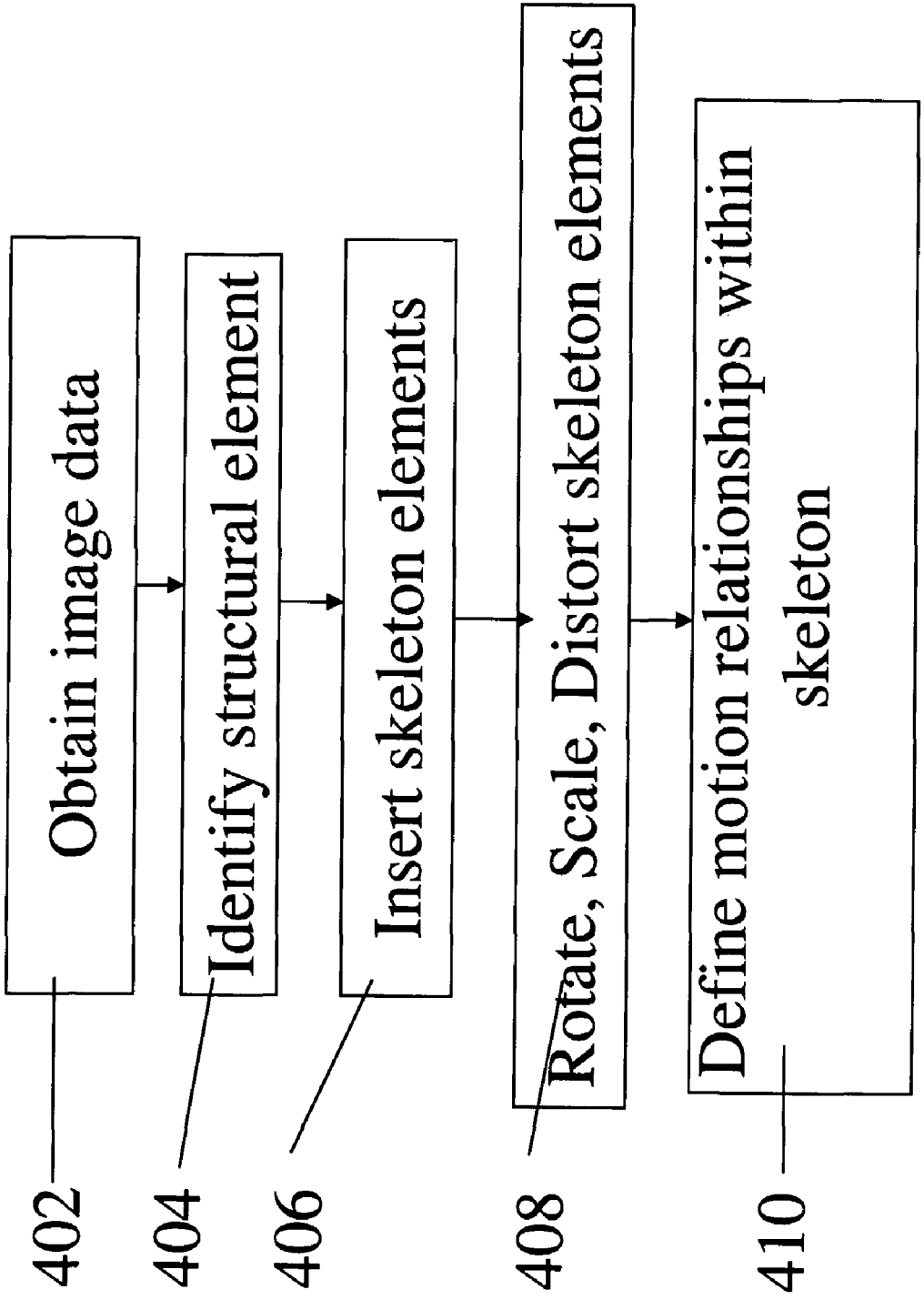
FIG. 4 is a simplified flow chart illustrating a procedure for inserting skeleton elements into a structural element identified from an image or series of images according to a preferred embodiment of the present invention.

Reference is now made to FIG. 4, which is a simplified diagram illustrating a process for obtaining a three-dimensional model including movement data, according to a preferred embodiment of the present invention.

Image data is obtained in stage 402, this data may be 2D data or partial or complete 3D data. Elements within the data are identified. Skeleton elements are inserted for association with the identified structural element in stage 406. Then in stage 408 the skeleton element is rotated, translated or scaled in order to fit the identified structural element. Translation includes distorting. Movement relations are then defined between the skeleton elements as per information available in stage 410.

Figure 5:
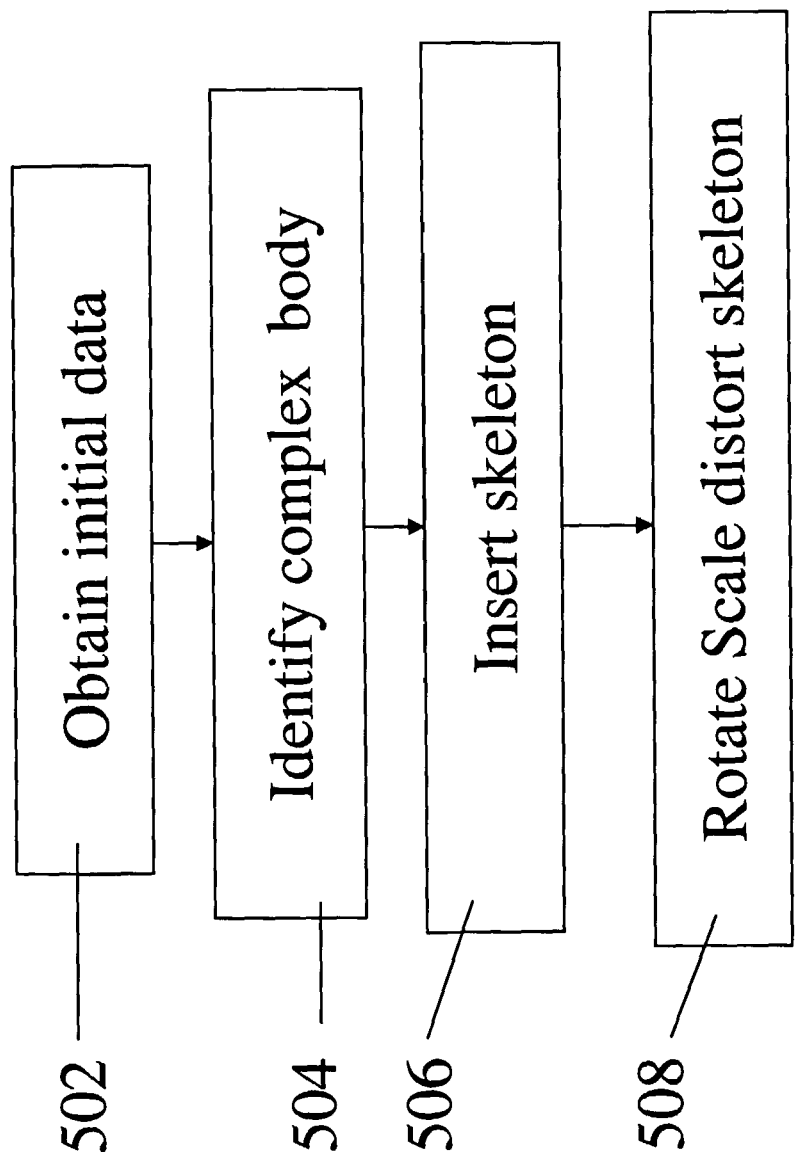
FIG. 5 is a simplified flow chart illustrating a modification of the procedure of FIG. 4 for the case of a series of elements being recognized as a single body.

Reference is now made to FIG. 5, which is a variation of the flow chart of FIG. 4 for the case in which a complex body such as a human is recognized. Again, the initial data is obtained, in stage 502. The complex body is identified from the initial data. The appropriate skeleton is retrieved from the data store in stage 504 and is inserted in association with the complex body in stage 506. Then in stage 508 the skeleton is rotated, translated or scaled. Translation includes distorting. The result is to produce a fit between the identified structure and the skeleton elements as necessary to fit. It is noted that the very attempt to fit skeleton elements to the complex body as in FIG. 4 above, may lead to the identification of the complex body as say a human, so that an appropriate complex skeleton may be selected.

Figure 6:
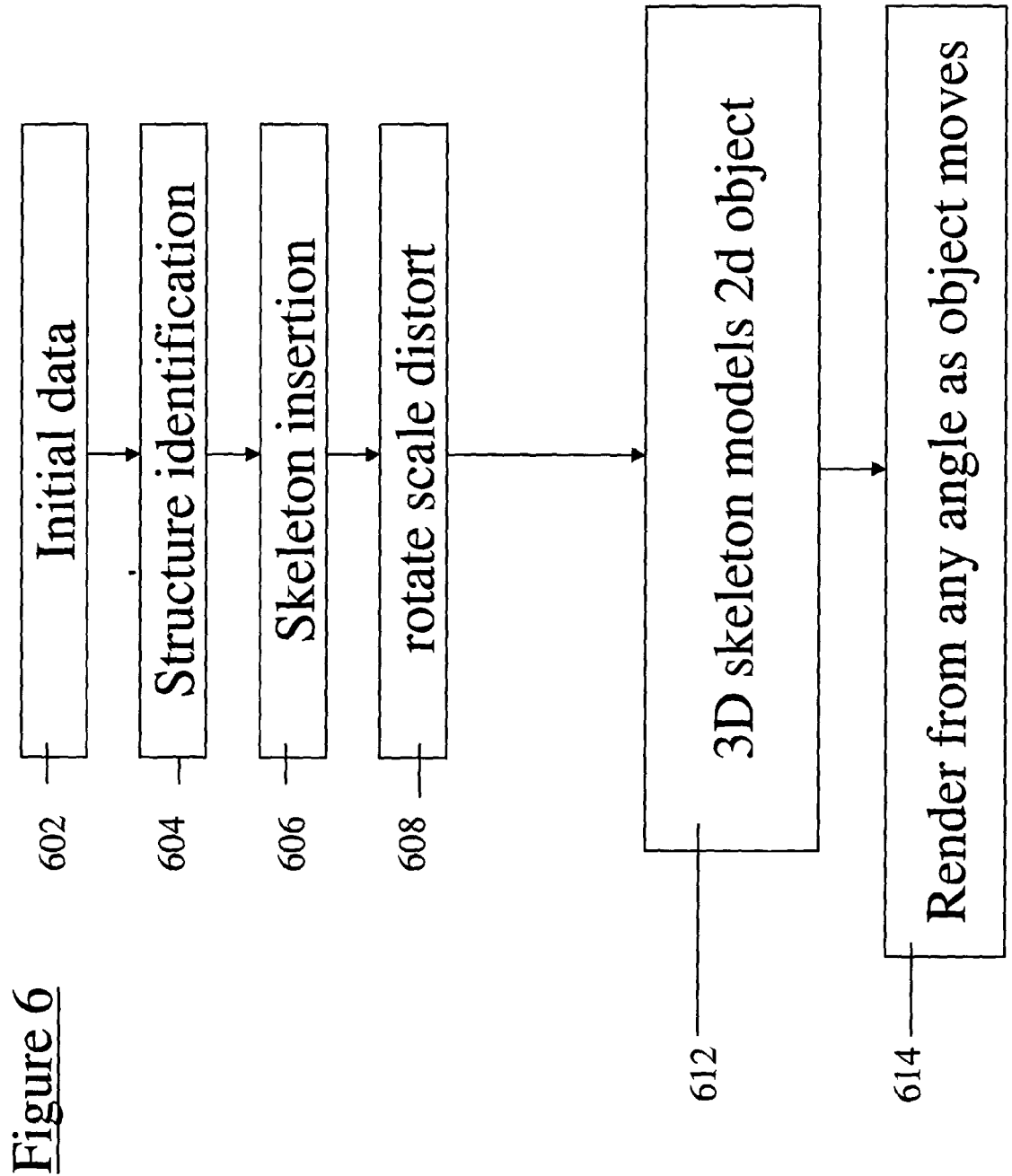
FIG. 6 is a simplified flow chart showing skeleton insertion and its subsequent use in providing a three-dimensional understanding of 2d image data according to a preferred embodiment of the present invention.

Reference is now made to FIG. 6, which extends the process of FIGS. 4 and 5 to movement of the object being modeled. Stages 602 to 608 are as previously described. Stage 612 involves the skeleton modeling the 3D object so that movement of the object is projected onto the skeleton and/or movement of the skeleton is projected onto 2D image data. Then in stage 614 the image data is available for rendering from any desired direction.

Figure 7:
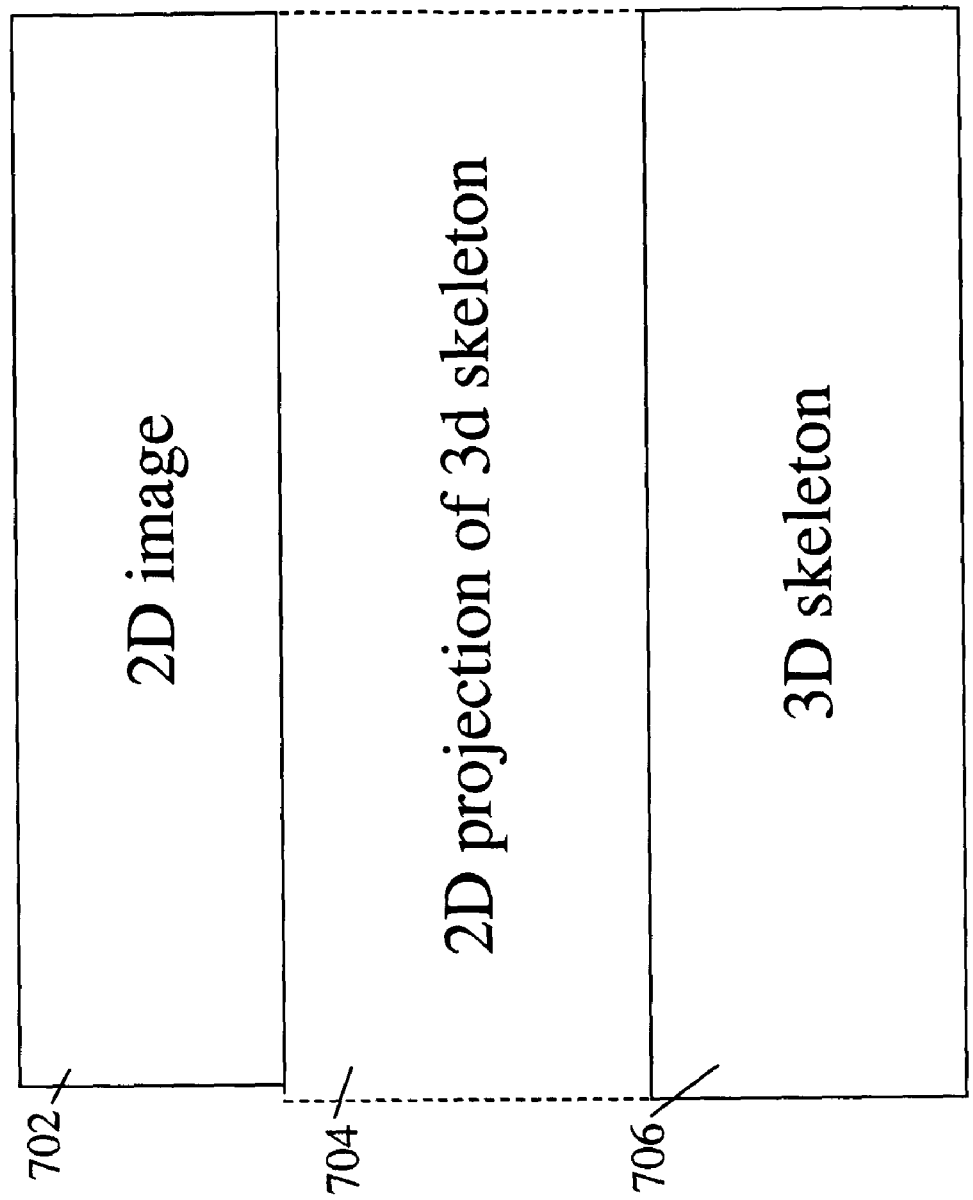
FIG. 7 is a simplified diagram illustrating a multiple-layer format to provide a 3D understanding of a 2D image.

Reference is now made to FIG. 7 which is a simplified diagram showing how image data may be managed in a layered structure according to a preferred embodiment of the present invention. The two-dimensional or partial or complete three-dimensional image data is stored in a first layer 702. The three-dimensional skeleton is stored in an underlying layer 706. A two-dimensional projection of the three dimensional skeleton exists in a virtual layer 704 in between. An ostensible two-dimensional image can be viewed from a different direction of that of the original 2D image in layer 702 by projection of the three-dimensional skeleton into that direction. The projection is stored in virtual layer 704.

Figure 8:
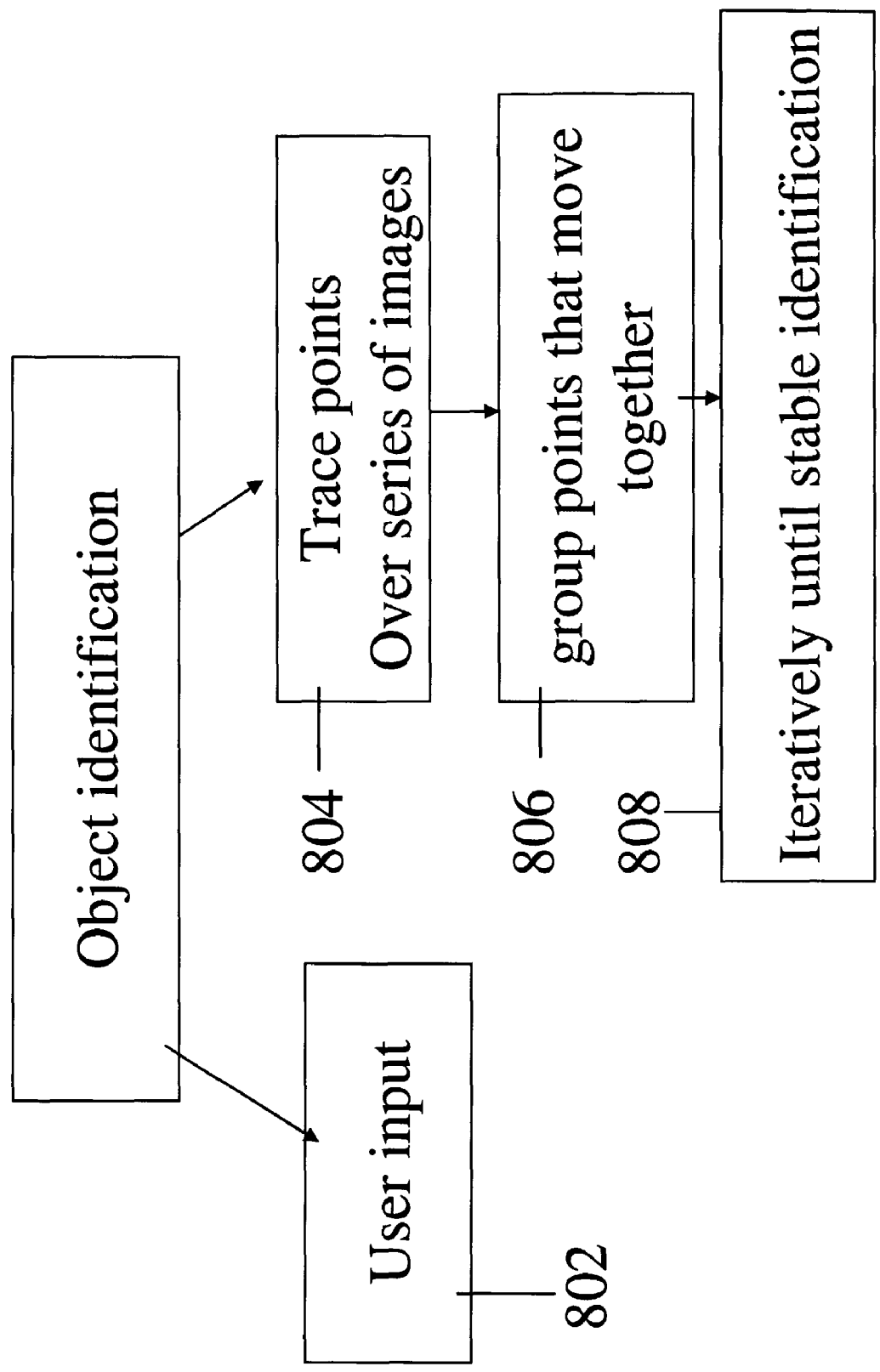
FIG. 8 is a flow diagram illustrating two methods of obtaining object identification from a 2 dimensional image in which to insert skeleton elements according to a preferred embodiment of the present invention.

Reference is now made to FIG. 8, which is a simplified diagram illustrating how objects and structures in the initial data may be recognized for the purpose of assignment of the skeleton elements.

Two paths are shown, the first being a manual path, stage 802, in which a user simply identifies the elements, bodies and complex bodies to the apparatus. As an alternative an automatic path can be provided for identifying the structures, consisting of stage 804, 806 and 808.

It will be appreciated that grouping and the decision about whether to continue could be viewed as a single stage. Points or pixels are traced over a series of images and points that move together are grouped together. The process of grouping is repeated iteratively until a stable identification is reached.

It is also noted that a mixture of the two processes may be used. For example a user may point out some elements or a complex body to the system, and the system automatically identifies other elements or identifies the individual elements within the complex body.

Figure 9:
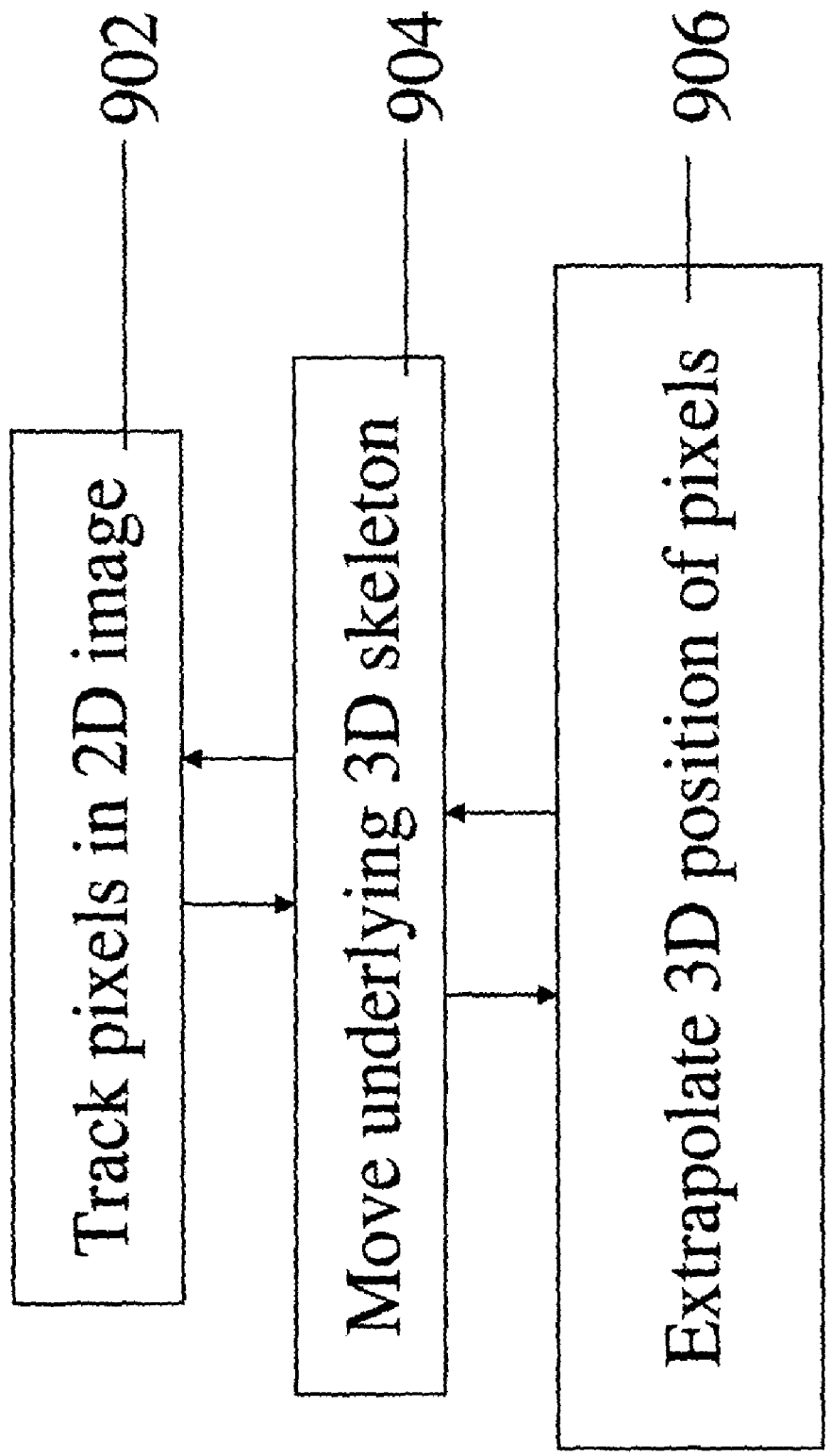
FIG. 9 is a simplified flow chart illustrating the process of using a skeleton according to the present embodiments in order to provide a 3D understanding of a 2D moving element in the image.

Reference is now made to FIG. 9, which is a simplified diagram illustrating the iterative nature of extrapolation of movement into the third dimension using embodiments of the present invention. Pixels are tracked in the initial 2D or partial or complete 3D image, stage 902. The underlying skeleton is moving in accordance with the motion of points tracked in its associated structure, stage 904, and an extrapolation is carried out in stage 906 to determine the three-dimensional position of the pixels in the initial image. It is noted that stages 904 and 906 are concurrent and affect each other, hence they are indicated by double arrows in the figure.

In a preferred embodiment of the present invention a computer generated time based photographic sequence may be constructed into a three 3D model.

Input for the initial data may be provided by a module for the reception and digital recording of photographed images or video clips, for example from already recorded video clips compressed in any known in art video format, or from a directly connected single or multiple camera(s) using USB or any other digital or analog connection which is known in the art.

Referring again to FIGS. 4 and 5, the initial data may be obtained, for example from one or more sequences of time based photographed images. Known in the art video or film sequences create time illusion of motion in the brain of the viewer.

The input data is analyzed. Preferably, the analysis involves a depth map construction of the input sequence(s), building depth maps for each of the time based sequences, and processing the depth maps, as described below in the algorithm section.

In a preferred embodiment, the present method ultimately creates a 3D model for objects captured by the sequence(s) of the photographed images 530.

These models are reconstructed from the real images, or from graphical clips or the like, where the time dimension is converted to the space dimension where all the figures and the static backgrounds are three dimensional models.

These 3D models may enable many manipulations that were previously possible only in a computer generated 3D virtual world.

According to a preferred embodiment of the present invention, individual figures can be identified in the sequence. Once identified they may be converted into stand alone 3D models. The movement of the figure can be compared with timings of the photographs in the sequence to provide a basis for mapping the movement of the figures from their progression across the photographs. Then it is possible to adjust the time lines separately for each figure to give a different sequence of events. In this way the figures being modeled can be morphed.

For example if, in our sequence, two people cross the street and person A reaches the other side before person B, now, since we have each figure modeled separately, we can alter the timing of the individual figures. Thus, we may decide that person B should cross the street before person A, thus altering the original time line of the photographed sequence and hence carrying out morphing of the sequence.

The apparatus enables the user to create several different kinds of outputs from the media based on the 3D space based models created. The user may use on the 3D space based models created with any external image processing, animation, broadcast and so on known in art programs, or may use an internal tool such as an editor. Such an editor may enable the user to create and edit two main kinds of outputs, linear media and non linear media. Linear media refers to time line based media, thus a sequence of images taken at specified time intervals. The user is able to create a clip based on time lined events he wishes to show. He is then able to export the results in a variety of viewing formats, thus for example: real time live video image processing, video clips, motion capture, stills images, DVD, spherical images, 2D images, stereoscopy images or any format which is known in the art.

The apparatus of the present embodiments may also create a non time-lined, that is to say non-linear media. Such non-time-lined output may comprise for example, a 3D surrounding comprising a set of images, animation, and texts.

The apparatus of the present embodiments provides the ability to present this output as a three-dimensional virtual environment in which a user can fully walk through any route of his choice, reach any point, look 360 degrees around at that point, interact with any figure, and so on. There are many examples for such a non-linear output: computer games, medical surgery simulators, flight simulators, etc.

The apparatus may include an animation editor, as per animation unit 316 of FIG. 3. The Animation editor 316, is a tool which gives life to every object the user chooses, the animation editor 316 also assigns to the object a certain movement such as a tree blowing in the wind or a walking human figure, with unique characteristics: how does he act when he walks, runs, when he is angry, sad, his face mimics, lips movement and so on. The animation editor may also attach to the object a set of predefined movements from computer animation or motion capture from an external source or using the apparatus motion capture tool, and can also define a set of movements and characteristics that characterize every object, a little limp for example, wrinkles in his forehead and so on. These movements are characteristics that assist in creating the personality of the figure. The animation editor may also allow creating voice characteristics using the apparatus motion capture tool for an object, which may enable him to speak.

The software preferably employs the method and algorithms that are described and illustrated below.

The 3D Space Based Model Creation in Greater Detail

The basic platform of a preferred embodiment of the present invention is placed in a computer generated 3D axis engine, utilizing three vectors, corresponding to the 3D axis engine, and a space-time vector as explained below.

Input image sequence S is the sequence of images which is input to the platform.

A preferred embodiment may implement the algorithms described below.

Sequence S is divided in to Nf(s) number of frames in the sequence, for example 25 fps in a PAL video display standard.

The first Frame of S0 (the first sequence) is denoted as s(0,0) (the second frame of the first sequence as s(0,1) and the last frame as s(0,n) ($\Rightarrow$Nf(S0)=n+1 frames).

A number of anchor points are used. The anchor points have two major elements, one element is the correspondence between the elements inside Si (where $0 \leq i \leq$ number of sequences), and the second element is the correspondence between Si and the 3D axis engine denoted as F.

Input, Depth Map & Anchor Points

An algorithm, according to a preferred embodiment of the present invention, may receive S0 as input and may use all the sequence frames therein for generating depth maps for the sequence. Factor D is defined as the depth vector of s(0,0) (will be defined later). Assume that z—is the set of depth values of different pixels from frame s(0,0). In s(0,0), d(0,0), is the set of points from the frame which depth value equal to z0, where z0=min(z). d(0,h) is the set of points from the frame which depth equal to zh, where zh=max(z). and $\{zi | \min(z/zi), i=0, \ldots, h-1\}$ (where z/zi means: the set z without elements from z0 till z[i−1]), so $\{z0, z1, z2, \ldots, zh\}$—is the set of depth layers of frame S(0,0)=>the vector D0, and this set is sorted in down-up order, it's clear from the definition that the numbers in this set are the layers of the vector D0 with respect to F's resolution factor as will future be explained. For example: D0=$\{2, 5, 6, 9, 13, 56, 22, 89\}$ then $\{z0=2, z1=5, z2=6, z3=9, z4=13, z5=22, z6=56, z7=89\}$. D0—is the depth vector for S(0,0), D0=$\{d(0,0), d(0,1), \ldots d(0,h).\}$ D of frame S(0,i) is a 3D matrix. The D of frame S(0,i)—is a vector of 2D mask matrices. If the depth of pixel d(i,j) is not defined for some reason, so d(i,j)=infinity, and will be defined in the boolean 2D matrix as 0

Note: if depth value of the pixel from frame d(i,j) can't be defined under the data from the 2D image from frame S(0,1) the algorithm will try to define it using the data from multiple frames from the same sequence S (the sequence from which we take S(0,i)) If the depth map of s(0,0) or a part of it cannot be defined due to bad lighting for example, the SP treats the d(0,0), or a defined part temporarily also as "∞" (infinity), and using s(0,1) . . . s(0,i) Si (where $0 \leq i \leq$ number of sequences), it tries to compute s(0,0).

In the case the frames $\{S(0,i) | i=0, 1, 2, \ldots, n\}$ (∈S (sequence no., frame no.)) depth map is computed, D0=$\{d(0,0), d(0,1), \ldots d(0,h)\}$ (∈D (frame no., depth enc. points)). The software finds the supremum of values from depth map matrix (max of depth values set)

SP also finds infimum of values from depth map matrix. If all the frames of sequence S0 depth map are successfully processed. SP finds the supremum and infimum anchor points of sequence S0 in every defined moment in time.

In s(0,0), d(0,0), is the nearest point of depth. The deepest point of depth in s(0,0) is denoted as d(0,h), D0∈{d(0,0), d(0,1), ... d(0,h)}.

The factor D is a Class of depth vectors in the algorithm, where several D vectors are used to analyze the data as a working tool to correlate the image depth structured maps. The SP structure map is built in F, using multiple new matrixes that are opened inside F for modeling static and moving elements, and for representing parts of elements (for example hands, legs and so on). D is built such that every point along this vector contains its corresponding depth information at a current depth, and furthermore expresses the depth values along the depth slice of every point just as altitude lines in a topological map do.

D is a 3D matrix, built as a 2D boolean image matrix (x,y) for every Z point along D, marking "1" in every 2D image matrix (x,y), only the information included in the image in the corresponding depth point (Z).

To find anchor points of reference between the frames of the video sequences S0, the system proceeds as follows:

{x,y,z}={horizontal, vertical, depth}={(1,0,0), (0,1,0), (0,0,1)}—is spatial vectors from F, we will call it "world coordinate system"

Now look at some frame S(0,t),t=some number, this frame has his local coordinate system {index of column, index of row, depth}

Let's imagine the k-th anchor point on this frame. It's position in the frames local coordinate system is: $(u_{tk}=i, v_{tk}=j, depth(i,j))$ The span(base) of this frame local coordinate system, in the world coordinate system is: $\{i_t, j_t, k_t\}$—were $i_t, j_t, k_t=(i_t \times j_t)$ are vectors in the world coordinate system In frames local coordinate system $i_t$—is (1,0,0), $j_t$—is (0,1,0), $k_t$=(0,0,1)

To find anchor points of reference between the frames of the video sequences S0, The system treats each frame (S(0,0), S(0,1 ... S(0,n)) as a sub space (that is a vector space itself) of the vector space S0, that is above the field F. The system computes the vector Base W0∈S(0,0), and where the span of W0 (W0=Sp{w1, w2, ... wm}) extends over the sub space S(0,0). There can be several different bases for each subspace but the span of each basis extends over W0, and the roles of the vector base vectors are similar to the ones known in art of Math. These vectors create the sub space W(0,0)∈S(0,0).

Depth Alignment

The depth alignment for rigid objects such as an image background is carried out in two stages. In the first stage, The system finds the vector base of W(0,0) where the Sp(w1, ... wm)=W(0,0)∈S(0,0). For fast alignment the system creates 4 vectors of reference from the vector base W(0,0) Horizontal, vertical, Depth, space/time vector.

The first vector Z∈S(0,0) reflects the number of base vectors in every point of d0∈S(0,0) and creates a Z vector which expresses the depth information of the base vectors in the frame. The midpoint of Z is also expressed as d(anc) and is the midpoint of the frame itself.

$$d_{(anc1)} = \frac{d_{(0,0)} + d_{(0,m)}}{2}$$

d(anc) can be a point that the system temporarily marks as the 0 point axis XYZ∈F. The horizontal and vertical vectors express the vectors in every horizontal and vertical point of the image matrix along the Z vector. the fourth vector of references is a space/time vector which is used as the transformation vector from the time dimension to the space dimension. Now the system has created 3 reference vectors for the alignment unified as D', to be used between S(0,0) and S(0,1).

The differences between frames may be a factor of lighting, moving elements inside the frame and camera behavior such as track in/out, track left/right, crane up/down, tilt up/down pan left/right and Zoom (regarding optical or digital photographs—the difference may be found in the amount of pixels per inch, that is lower in digital zoom). The different shifts between the frames is mostly found in the form of the location of the pixels, thus there may be a shift of the pixels of some manner between the frames, and so SP 1 computes the three reference vectors of the frames of S0 as a function of the space/time vector. Three corresponding vectors are constructed for the 3D alignment of the images where the vertical and horizontal vector correspond to a spatial window (X,Y), and the Z vector corresponds to the depth vector.

Each factor in the spatial (X,Y) vectors reflects the base vectors of the image in the spatial domain along the Z vector in every point of the image.

The matching function should aspire to zero difference, or up to a minimum predetermined point between the vectors V(h0/v0/z0) of image 1 and the vectors V(h1/v1/z1) of image 2, targeted to find 0 difference in as many points as possible. Regarding the alignment of the unified section of the vectors, at the respectively opposite edges of both vectors there may be an inconsistency at the points of difference between the frames. These points of difference may refer to the different information that may be added to the new frame but does not appear in the previous frame.

V'0∈V0∈V0∩V1,
V'1∈V1∈V0∩V1,

The three vectors are the outcome of the three dimensional positional information of the images and have no relation to the visual information but rather represent the base vectors of the image in every point.

Preferably, the horizontal, vertical, and depth vectors are compared with each vector separately, to find minimal differences in as many points as possible.

There may be inconsistency at the points of difference between frames. These inconsistencies may indicate that different information appears in one frame that does not appear in a previous frame.

Dealing with Distortions and Camera Movements

An optical element such as a lens of a camera creates distortions of the photographed image and may create minor difference in the depth map due to distortion of the same object.

Figure 14:
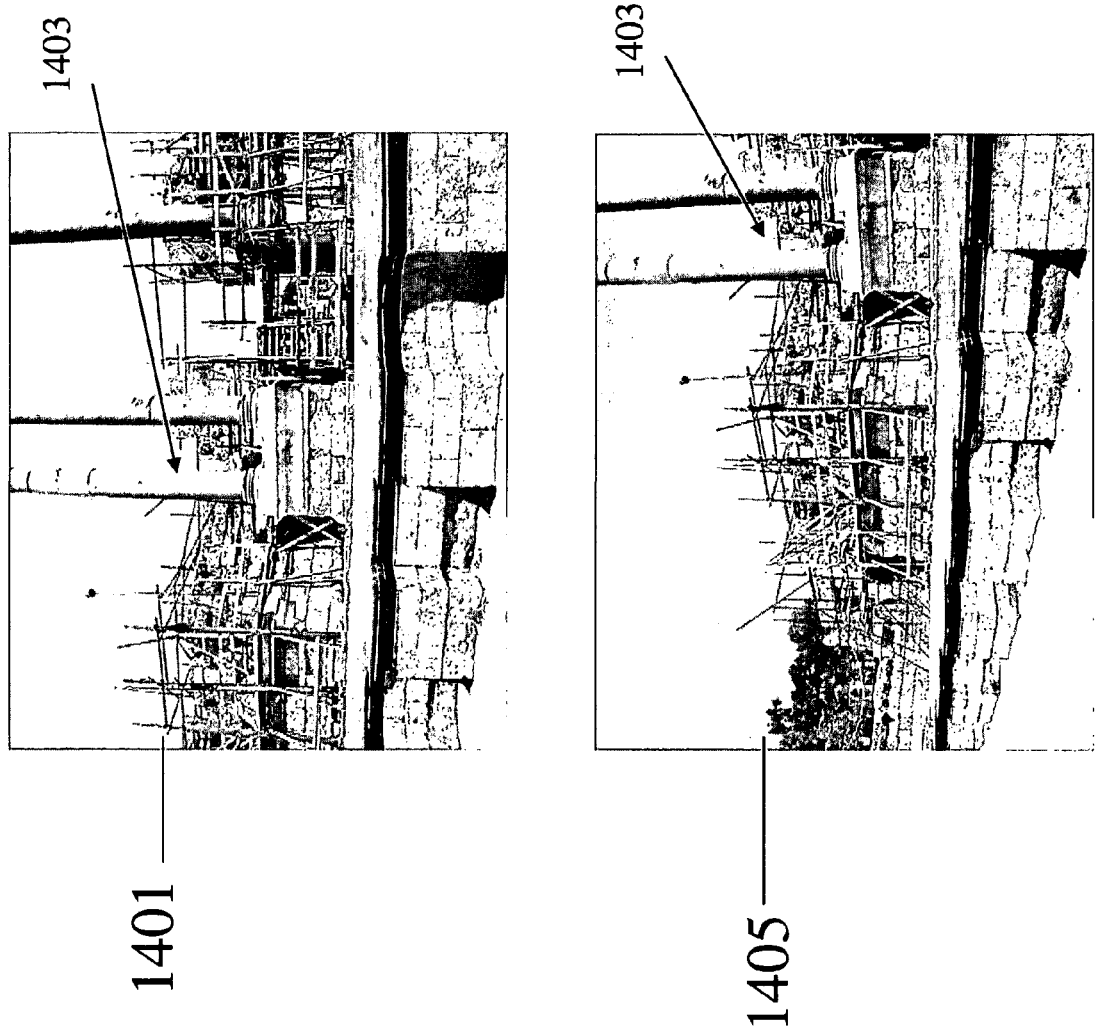
FIG. 14 illustrates how a structural element in a series of images should be processed from a frame in which it is in a position of minimal distortion.

Reference is now made to FIG. 14 which shows two images and illustrates a point about camera movement distortions.

In first frame 1401 a stone column 1403 appears in the center of the frame. In a second frame 1405 the same column 1403 is on the right part of the frame. Now there may be some distortion as a result of the optical process and the depth map may bear minor differences that are due to those distortions. Consequently, there may be some discontinuity in the outcome results of the aligned images, which discontinuity is the outcome of these distortions. In other words the structure of the block appears to change for optical reasons as it moves from the center to the side of the frame.

The solution is to identify a best image of a given object as one where it appears relatively centrally in a frame. The pixels receive the 3D location obtained from this most accurate measurement.

When aligning the Z vector, we may also suffer from differences in the zoom factor between the images (optical or Digital), or track "in" or "out" of the camera.

The smaller is the shift of the camera between the frames, the bigger is the correlation between the vectors, and the better the result is. The bigger the difference between the images, the smaller is the correlation between the vectors. SP sets a threshold for the deviation, and regards locations having a bigger difference as pertaining to different objects.

After aligning the unified sections of the horizontal vertical and depth vectors:

$V'h/v(0) \in Vh/v(0) \in Vh/v(0) \cap Vh/v(1)$,
$V'h/v(1) \in Vh/v(1) \in Vh/v(0) \cap Vh/v(1)$
$V'z0 \in Vz0 \in Vz0 \cap Vz1$
$V'z1 \in Vz1 \in Vz0 \cap Vz1$ The unified sections are now treated as a sub space and the vectors are recomputed as a reference of this sub space. The zoom factor comes into consideration, by computing vectors with a "Scalar" factor over the F field, a scalar that may multiple the vectors or divide them and thus mimic the zoom/track in or out of the camera, where the same relation between the elements in the frames is preserved, but the resolution may vary. Using the assistance of the scalar we can align the vectors of $S(0,0)$ with $S(0,1)$. This process may align the images, and may also point to the alignment direction of the next frame. The space/time vector relates to the transformation from the time domain to the space domain, the new alignment is now regarded as a unified frame$\in F$, and the next frame is aligned with the previous unified frames. This can also reduce the computation especially when the frames repeat already aligned areas. The Space/time vector is the reference vector for the transformation from the time dimension to the space dimension.

Dealing with Inconsistent Depth Information

In the event of an inconsistency of depth information the apparatus preferably opens a new vector plain, denoted as F1. The new plain is an empty XYZ coordinate system in which the process of this algorithm starts from the beginning.

At the end of such a process the user, of the system is asked if he wishes to leave F0 and F1 as different locations or rather choose to align them. The user may then be asked to manually align F0 and F1 (Alternatively, the user may command the system to automatically align F0 and F1) using tools such as rotation, zoom, flip and so on, in order to manually align the two structures.

After the user manually aligns the F0 and F1 he commands the system to compute this alignment and the system tries to align the fields using the alignment algorithm. If the fields are well aligned then the system announces it, if not—SP asks the user to set a lower standard for the misalignment factor (less accurate alignment), The system further provides the user with a tool box for overcoming discontinuities in the image plain using known in art image processing tools.

SP Resolution

The system 1 defines the temporary resolution of "F0" (the Field of the XYZ axis) sign as "R0". R is defined by the number points of reference per inch. The resolution is the outcome of the combination factor of image resolution in terms of pixels in the time dimension, and the combination of points of depth in the space dimension. A resolution tool can assist as an example in the alignment of two video clips shooting the same location from different distances.

For example a table, may be shot in a high resolution clip where there may be more points of reference between the parts of the table for example from one leg to the next. or from a closer location compared to a second clip that has lower resolution, or using digital zoom or from a greater distance resulting in a lower number of points of reference.

A point of reference for dealing with the resolution issue is the 3D location of every pixel with reference to reality. Thus the 3D location of the pixel in the space dimension is the computed position after transformation from the time dimension. The resolution allows D0 to correspond with S0. The middle point of D0=d0(anc) may be temporarily placed in the center of the axis field at the point $(0,0,0) \in (X Y Z) \in F0$ The visual information of the points of reference may be layered in F0 as the visual layer of information, as further explained below.

Identifying & Reconstructing Moving Elements

In the cases where moving elements appear in the image. The skeleton consists of moving graphical elements and defines their relative positions and movement patterns, so as to construct a highly accurate 3D geometrical model of a moving element, preserve its motion capture, and attach the photographed visual information to the 3D model. The system enables the automation of the identification and reconstruction process.

First the system has to learn that it has a moving element in the data image sequence. The next stage is to identify the element in the data image with a presorted or user defined skeleton element. Finally the system carries out a reconstruction of the 3D structures of the element using predetermined 3D structures & skeletons or the system creates a stand alone new 3D structure built gradually, based on the characteristics of the element.

Moving elements that add different information than their background with respect to the camera can be semi static objects that add minor information over time, such as a tree which moves in the wind, or a person who crosses the frame, turns around and steps out of the frame on the other side.

As mentioned above, the system firstly learns that it has a moving object in the sequence. Next, the system identifies this object using a set of predetermined 3D elements or skeletons. Alternatively, the user may define and attach a skeleton or elements to the figure.

Then the system constructs the 3D structure of the figure using the predetermined 3D elements or skeleton or a new user defined element.

For identifying that there is a moving element in the frame, the system searches for discontinuity of depth pixels in the sequence over space and time. That is to say that there may be a certain special 3D structure in S0 that is not coherent with the solid points of S0 with respect to the camera and background in the space dimension, but rather changes its information over the time dimension.

In other words there is a misalignment of space over time. For example, if we shoot a table using a camera which moves to the right, the table first appears in the right side of the frame and then moves toward the left part of the frame.

If there is a 3D element in front of the table whose information varies over the time dimension the system may conclude that there is a moving object in the frame. The system reconstructs a 3D model of the moving element, where the table is a static element.

For the creation of the 3D element in a dimension-based image processing, the matching vector can be constructed from the region around an element in question.

A rectangular window of size N×M×Z can be chosen, thus a 3D Matrix. N and M are the spatial sizes of the window, and Z is the depth dimension. A fourth vector can be provided to define a transformation dimension of the element or object from the time dimension to the space dimension, to lead to the construction of the 3D elements and figures. Matching the element both in the time and space dimensions enforces a consistent matching of all points along corresponding 3D structure maps that may be separately built for each element or object.

The algorithm of the present embodiments is based on the projection of the 3D information structure on to the 2D image to assist in the tracking of the moving element in the frame in relation to its background and the absolute 3D surrounding.

Identification of the Element

Identifying the current element from the image data may be carried out with the assistance of a set of presorted 3D structures. The system operates in steps to determine the form of the element in question or parts of it, up to the identification of the whole structure, and also assists the user to construct new structures.

Figure 12:
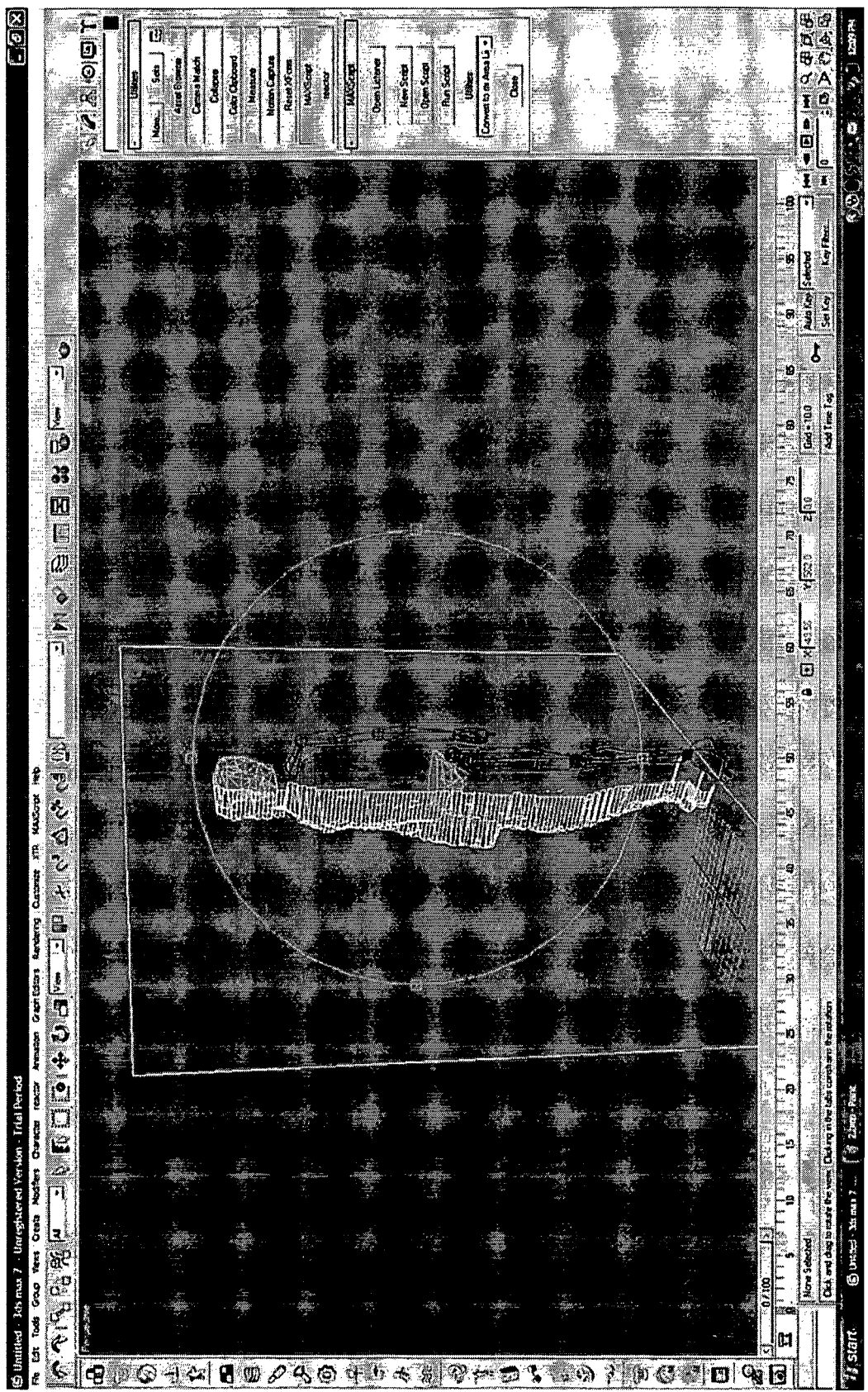
FIG. 12 is a skeleton attached to a depth map, illustrating possible imaging processes in accordance with a preferred embodiment of the present invention

The system may be provided with a data base comprising a set of 3D structures for the skeleton elements, beginning with simple 3D geometrical 3D models such as a ball, box, pipes and so on, and up to full skeletons of rigid and non rigid bodies. Skeletons can be rectangular regions for identifying and modeling a car for example, and up to animals and human's skeletons as shown in FIG. 12.

A skeleton is a complex 3D data structure that includes three crucial elements:

1. the physical assembly of the skeleton, that is the shapes and interrelationships of the constituent skeleton elements 2. shaping information of the skeleton according to the input 3D information, 3. incorporating of internal information such as the physical structure of a body (bones, muscles, joints and so on) and physical behavior of a body.

The above three aspects are required for the identification and reconstruction process, according to the algorithm of the present embodiments.

1. The assembling of the skeleton refers to taking the structure of the skeleton and defining its parts, down to the smallest definition of body parts, in the sense that from these parts, the skeleton elements, the system can understand and build the body in question or build new bodies at the request of the user.

For example—the human arm may be based on a 3D cylinder, connected via a joint to another cylinder which may represent a hand. In another example, the head may start with the simple figure of a 3D ball, and may be connected to a joint which represents the neck. The neck in turn is connected to a big cylinder which represents the trunk. The different physical behavior of the skeleton's parts and physical behavior of the individual elements in humans, animals, and so on are incorporated to reconstruct the basic configuration in question, thus assisting the system to identify and reconstruct the figure.

Figure 13:
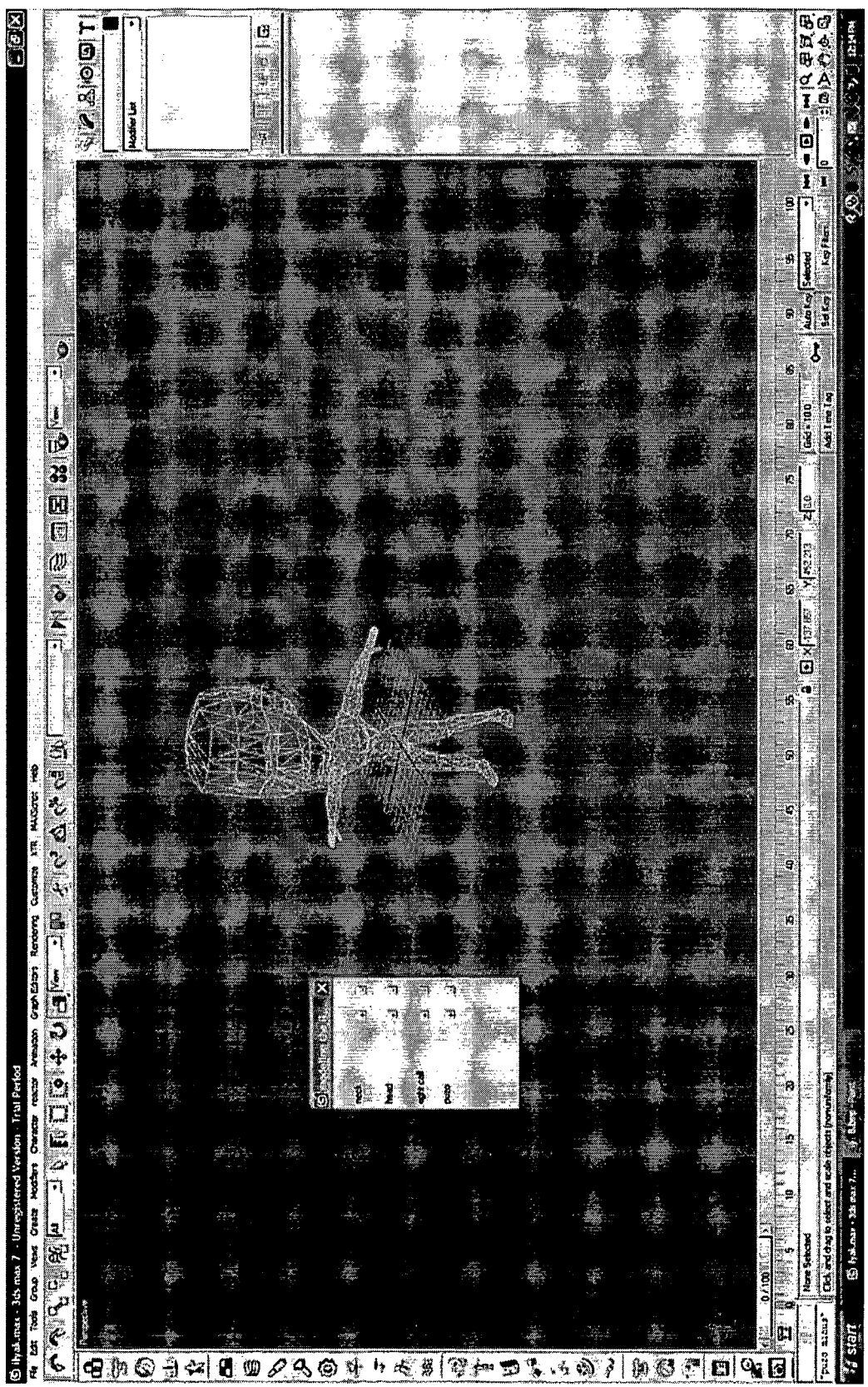
FIG. 13 is a skeleton demonstrating the process of deformation of its structure illustrating possible imaging processes in accordance with a preferred embodiment of the present invention.

2. The ability to shape the skeleton according to the input 3D input is used in the identification process and in the reconstruction process as explained below, with respect to FIG. 13 which shows a skeleton in which a part thereof undergoes a deformation.

3. Internal information such as the physical structure of the body (bones, muscles, joints and so on) and its physical behavior are used in the identification process and in the reconstruction process as explained herein below.

Using the set of 3D structures and skeletons, the system determines the identification of the element. This process can be done automatically or manually by the user as shown in FIG. 8, and involves identifying the element in question to the system and attaching an internal skeleton to the figure or building a new structure.

As a moving object is located in the sequence of frames, the system attempts to identify it and attach it to a set of matching skeleton elements, chosen from a previously defined set of skeleton elements, or a specific skeleton, defined for the moving object by the user, preferably using a set of tools which is provided by the system. Preferably, the attached skeleton elements are automatically adjusted to the size, shape and movement pattern of the moving object, so as to fit the moving object in terms of size, shape and movement pattern. The system completes the set of skeleton elements with an appropriately overlaid texture.

In a preferred embodiment of the present invention, the system further provides tools for extrapolating the moving objects onto a 2D plane for any desired point of view.

Exploiting the properties of the 3D structure based alignment allows us to match information in various situations such as between different video sequences, matching under scale (zoom) differences, under different sensing modalities (IR and visible-light cameras) and so on.

The creation of 3D structures of elements from the moving objects is the basic factor that assists the system to handle differences in appearance between different sequences.

An element may be attached with a basic skeleton made of tubes and joints attached to arms legs and body, and a ball to the head, the depth alignment may add new information to the creation of the 3D element structure and to the correlation with the 3D figure, such as the physical behavior of the basic skeleton, length and thickness of the tubes with respect to the arm, body, legs, the size of the ball attached to the head and so on.

The construction of the full 3D figure out of these separate tubes and balls may reveal their mutual behavior—how they are attached to each other, or move. At his stage, the system determines what kind of element faces, or decides that it cannot determine what the element is and asks the user to assist to determine the figure in question, or the user may also form a new structure that does not exist in the basic set of predetermined figures.

As described above, the software tries to identify the structure of the moving object, as much as possible using its depth information. With the assistance of a set of previously defined 3D elements, step by step, the software determines the form of the object parts, to complete the full structure even if some of the visual information does not exist.

The first step is to identify the object and determine its basic form. Then the system attempts to complete it as much as possible.

Using the basic form, one can learn about the element in the spatial domain and the depth domain. SP tries to reconstruct the object details using a set of 3D skeleton elements (such as a ball, a box, pipes and so on.)

3D Structure Maps of Moving Elements Using a Single Camera

The system may receive a full depth 3D map of an image. There are known in the art algorithms for constructing depth maps of images including its moving elements. Depth structure maps using space time stereo algorithms for example, make use of at least two cameras.

There are known in the art algorithms for constructing depth maps of images of static surroundings using space time stereo algorithms for example, with a single camera.

There are known in the art algorithms for creating static models from video sequences using one camera, also without extrapolating the depth map.

The present algorithm can be used for extrapolating depth maps of moving elements using a single camera, as described above.

For construction of a depth value of a moving element the system may use a pre-acquired depth value of the static rigid background using known in art algorithms, and refer to the moving element as a stand alone 4D matrix with relation to its background, using reference points.

The projection of the 3D information structure (such as a pre made 3D skeleton) on to the 2D image plane assists in the tracking of the moving element in each frame in terms of the depth axis. Together with the relation to the projection of the 2D image plain in to the 3D space, there is provided the ability to create depth maps of the element. The attachment of the skeleton and organs fits the image to the depth maps, synthetically duplicating any object and capturing its motion. The latter process may further involve overlaying texture of the element on the reconstructed skeleton, completing the reconstruction process as further explained below.

The present method thus forces the creation of the 3D map of the moving element in the frame.

The first step of depth extrapolation is the tracking of the 2D position of every pixel along each frame, creating a trajectory for each pixel.

This tracking is performed using known in art tracking algorithms.

As previously explained, passive methods for finding the same pixel on two images and also along the time dimension use alignment of color, shade, brightness, and ambiguities of the pixels to locate the same pixel in two frames, and along the time axis.

The present tracking algorithms in the 2D image plane in time lack any projected pattern to assist the identification and thus tend to collect errors over time.

The above observation is especially true if one tries to implement the above depth extrapolation algorithms to track the same picture or pixel from one camera in a movie clip of a moving 3D element, where one has hidden information (a hand behind the body that appears, change of lights and so on). The independent movement of pixels incoherently with the background results in problems such as finding the wrong tracking points from one frame to the next few frames. Furthermore, using one camera with a single angle has disadvantages in that the camera does not have a full simultaneous view. Thus in imaging a person, the person usually has two legs and two hands. However the 2D-based tracking technique often does not distinguish between the legs of a person or the hands which for some of the frames can be hidden from the angle of the camera and suddenly (re)appear with no continuity. ( ) Thus tracking in 2D becomes a complicated challenge Extrapolating depth value from such 2D tracking cannot result in a real depth map.

However, when using the 3D skeleton as the projected data structure on the 2D image plain, each frame is on the one hand a 2D projection of a 3D data structure, and on the other hand a 3D projection of a 2D data structure, with identified organs of the body, say hand, left leg, right leg and so on.

The result is that tracking mistakes cease to occur. Since the 3D posture of the skeleton is projected onto the 2D plain along the time axis, exact tracking with infinite new tracking points in every frame, is generated from the 3D projection, so that the system knows where the hidden parts of the 3D body are and where they are in the 3D space. The system may just project the 3D parts onto any requested 2D image plain, even when the parts requested are currently invisible to the source 2D image.

A predetermined 3D skeleton is projected onto the 2D image plain. The system in effect creates a shadow like image in an additional layer of information as explained above with respect to FIG. 7. The extra layer of information pinpoints the parts of the image that need to be tracked, cutting the errors immediately and preventing their growth. Such a stage allows for tracking and extrapolating the depth of a moving element such as a walking person, who includes both rigid and non rigid elements. The 3D skeleton may then be used for extrapolating the 3D depth map of the already tracked 2D element in motion. Using the infinite points located on the 3D skeleton to force trajectories along time of pixels in the 2D image, using reference points is made possible in that the 4D matrix referred to above surrounds the elements as projection points in the 3D space with respect to the 2D space and vice versa. The system is thus able to use triangulation along time and 3D tracking of points using the 3D skeleton data structure to force the creation of the exact super-resolution level required, with depth map information of the moving element in each frame. In an example work flow may proceed as follows:

Given M—is an R.G.B Matrix of 2D (x,y) pixels, n—Number of frames,

A—a moving element with respect to a background,

B—the shadow like layer—a 2D matrix of a gray scale "Shadow" figure,

Q—Feature points in every frame, with defined threshold,

T—Trajectories (2D point locations vector of Q), $\delta$—The transition function of T on Q, K—The number of frames that Q has (=the length of T), Z—3D extrapolation.

The input is thus "M" with n frames. The system identifies the moving element, as is explained elsewhere herein, and there then follows a process of aligning F(b)←G(A) the 2D projection B of the 3D skeleton on A. Alignment is for an initial defined threshold which can be changed.

The process continues by searching and tracking Q, thus creating a T for each Q, where $\delta$ is $\delta(f(a,b)i$, and qi+1) is the function of the trajectory vector. Tracking achieves the location of the feature Qj in frame i on image a and shadow b, and adds it's location in frame i+1, and so on for (k) number of frames. It attaches the new point in I+1 to image B, the new information on frame i+1 will enable to move image B according to the movement of image A. Thus the leg in B will follow the leg in A. The process then receives a new infinite number of Q accurately positioned in every new frame. For each T we will extrapolate Z, and the output will be an exact super resolution depth map of the moving element.

The Z dimension may then be extrapolated using reference points from the 4D matrix surrounding the element at t, and t+1 and so on. This may be done with respect to the camera's motion and focal point with respect to the background. Rays from the reference points then enable the computation of:

the 2D transformation with respect to the 3D data structure, the 3D transformation with respect to the 2D data structure of pixels, or feature points for using triangulation extrapolation of Z, or for tracking the 3D position of pixels or feature points for creating an exact super resolution depth map of the moving element, from a video clip of a single camera.

The depth extrapolation process could be for example the following.

Assume {a,b,c, . . . } are 3D ref points for which we know the 3D coordinates.

t—is a 3D point (pixels or feature) on the element in time 't' (whose 3D co-ordinates we wish to find), and 't+1' is the same 3D point but at time 't+1' (for which we also want to find 3d co-ordinates.

Projecting rays from the ref point to t and t+1 creates triangles [t+1 t, a], [t+1, t, b], [t+1, t, c], . . . .

In every triangle we know the 3D coordinates of its reference point. We have 6 unknowns (every triangle consists of the unknowns {t,t+1}, where t,t+1 are 3D points.

In the 3D space all triangles must have the same distance between 't' and 't+1'. solving this equation system we find t and t+1 for each pixel or feature of every Q in every frame, and compute the 3D coordinates of the triangles, out of the 2D projection of the triangles on the image plane.

The construction of 3D structure maps of the elements in motion assists the system to further fully reconstruct the 3D model of the element, recover the 3D geometry between different sequences, and handle differences in appearance between different sequences.

3D Reconstruction

Following is an explanation regarding the creation of the element's model, using the projection of the 3D skeleton onto the 3D depth maps and the depth maps into the 3D SP space, while attaching the skeleton organs fitting it in to the depth map's formation, synthetically duplicating it and capturing its motion. The last process will be to overlay the texture of the element on the reconstructed skeleton, completing the reconstruction process as will further be explained.

The present method enables forcing of the creation of the 3D model of the moving element in the frame.

The present algorithm is space based in concept. On the one hand the projection of a 3D information on to a 2D image plane also enabling extrapolation of 3D information, and on the other hand using the space dimension based algorithm projects the 2D world with its 3D depth maps into a space based 3D world.

The N×M×Z window referred to above, which was chosen around an element in motion, is actually a 3D matrix (that turns in to a 4D matrix), a new (XYZ) axis field "f", where the user can attached a pre defined internal skeleton or parts of 3D figures (tubes, joints etc).

The process of depth extrapolation also includes the identification of each pixel and feature movements between frames, creating a 2D motion flow of pixels and features over time. The system transforms the 2D motion flow into a 3D motion flow.

Given a 3D depth structure map of S(o), or a set of 3D trajectories, or as will be explained while still in the process of depth extrapolation, the system may use the reconstruction algorithm to correspond between the factor D of each frame (and the unified frames) with the internal attached skeleton over time (with its own factor D') to define and construct the proportions of the internal skeleton transforming the 3D matrix in to a 4D matrix over the space & time dimension using the fourth vector referred to above, that is transformation between space and time.

The process of depth extrapolation and reconstruction is intuitively speaking a layered machine in which a 2D reflection of a 3D structure is layered underneath the 2D image matrix. The 3D structure itself is layered underneath the 2D reflection of a 3D structure being used to construct the synthetic 3D reconstruction of the element in the frame. This three-layer structure is as described above with respect to FIG. 7. Working under the space dimension enables reconstructing the 3D structure, and texture as will be explained herein, and even preserving the element's motion where the output is motion capture of the element in the frame as a 3D model. Or for that matter the output could be a specific 2D projection.

For the reconstruction process of the moving elements, the system may create a full 3D structure depth map or receive a full 3D structure depth map of the moving elements. The static surroundings are modeled separately from the moving elements as previously was explained.

The present embodiments enable a full 3D super resolution reconstruction of a 2D body such as a human in motion from an original 2D or partial 3D image, to a 3D model. The process involves also capturing the 3D structure texture and motion, constructed on the base of an internal 3D skeleton. The skeleton may be built with full internal bones and muscle using a full skeleton physics' data base. The system enables infinite manipulation on the 3D reconstructed model, for example for animation, motion capture, real time modeling and so on. FIG. 12 illustrates the building up of a full anatomical model from individual skeleton elements.

Projection is carried out using the 3D depth map of the image and body, using the 4D matrix around the element with respect to the background, using the reference points.

Elements are identified as explained above with respect to FIG. 8, using automatic identification or manual identification and attachment of the 3D skeleton or parts thereof to the 3D depth map as previously explained. The system projects the 3D data structure, namely the 3D skeleton into the 3D depth map, Tracking of the 3D movements of the element over frames is based on the DTM optical flow of the pixels and trajectories. Tracking allows for learning as much 3D information as possible on the 3D formation of the element, and interpolating the skeleton's 3D structure onto the depth map acquires its 3D formation. The skeleton's 3D structure preserves the learned information of the element over time, in order to design the skeleton's 3D structure to as accurately as possibly provide the element in the image.

For example, let us consider a photographed man. A first stage involves assigning a skeleton to the object. A second stage involves using the skeleton to learn the details of the object, such as the structure of the face, eyes, nose etc. Having learned the kind of structure from the skeleton it is now more a process of expecting to receive certain details and adjusting the right 3D details to the figure.

For example, after recognizing that the structure in the image is a man, the system, in accordance with a configured policy, expects to receive 3D and visual information of, for example, the eyes, nose, etc. Since the SP expects the eyes and eyebrows, for example, in certain areas of the head, it is easier and faster for the SP to analyze this information with respect to the 3D figure.

Computing the location and distance between the organs of the moving object, assists the SP to more accurately estimate the relations of the other organs of the object and coordinate this information with that of the 3D figure.

By using the space dimension in the image processes, there is an added value to the movement of the element over the time dimension with respect to the fact that every different frame supplies more 3D and visual information to the construction of the 3D element and figure.

Parallel to the reconstruction process the present embodiments can be used as a motion capture tool to acquire the movement of the element, enabling the user to motion capture the element in the frame, not only as a 2D image but as a 3D model with texture.

The process of the reconstruction can be carried out in the following way.

The initial configuration is a 4D matrix, the input will be a DTM.

The DTM can be from an external algorithm. The DTM can also be from the depth extrapolation algorithm of the present embodiments. In terms of processing time, the modeling process is a parallel process to the depth extrapolation process, where intuitively speaking several matrixes are located one beneath the other, in which the first matrix is the image 2D matrix, below that is the 2D projection matrix (of the 3D structure), and below that is the 3D data structure. The input also includes 3D trajectories based on the 2D tracking of the pixels and in particular of feature points that are set along the frames to allow movement to be followed. The feature points may be based on color or other properties easy to track.

The trajectories are transformed into the DTM, and the system transforms them into 3D trajectories that mark the 3D position of pixels and feature points along the frames.

The system sets a constraint between the projection of the 3D skeleton, and the input depth maps, along the time axis making an exact tracking with infinite new tracking points in every frame generated from the 3D projection with identified organs of the element. It thus knows where the hidden parts of the 3D body are and where they are in the 3D space. The system carries out 3D tracking of the points using the 3D skeleton data structure to force the creation of the exact supper resolution 3D model of the moving element.

The work flow, may be as follows: Given:

E3d—sequence of DTM's—3D Matrix of (x,y,z) of the moving element, n—Number of frames, S3d—the 3D skeleton.

Q3d—3D feature points in every frame.

T3d—Trajectories (3D point locations vector of Q3d),

δ3d—The transition function of T3d on Q3d.

K—The number of frames which Q3d has (=the length of T3d),

Model—the reconstructed 3D model.

The system aligns F(E)←G(S) such that the 3D skeleton S is aligned into the DTM-E. The system uses T3d to 3D track the Q3d on Et to the next DTM Et+1, where δ3d is δ3d(f(s,e)i, q3di+1) the function of the trajectory vector, the location of the feature Q3d j in frame i on skeleton S and DTM E, and adds thereto its location in frame i+1, and so on for (k) frames for each Q3d. For each frame it attaches the new point in I+1 to S, and the new information on frame i+1 allows alignment of S according to the new position of E (e.g: leg in S will align with the leg in E).

The result is the ability to receive a new infinite number of Q3d accurately positioned in every new DTM. Factor D and D' enables the system to change the formation of S, according to the formation of the collective 3D information of E3d, in the 4D matrix surrounding the element & skeleton in t, and t+1 (and so on). The system infers from the model where limbs and other elements may be expected to appear in the following frame. D is the key factor in the complex mathematical structure that synthetically duplicates S3d in the form of the 3D element. The system transforms the 3D skeleton in to a new data structure, collects and saves the gathered formation in the sequence of the DTM's on the 3D skeleton data structure, by tracking the 3D position of the pixels or feature points for creating an exact super resolution 3D model duplication of the moving element.

Assume {a, b, c, . . . } are the points with 3D coordinates on E3di. An estimation is done to attach the corresponding points on S3di {a', b', c'} to the points in E3di. A system aligns the factor D' of the sub space of the 4D matrix to the factor D of E3di, aligns S3di as a unified unit and also splits S3d in to predefined miniature 4D matrices which each hold one D' factor as a stand alone 4D sub space, thus, reconfiguring the formation of S3di to the formation of E3dI, and then on to i+1 . . . . The output is then an exact super resolution reconstruction of the element (shape and texture as will further be explain), and the 3D motion capture of the moving element.

The texture overlaying is part of the modeling process, as will further be explained hereinbelow.

The above mentioned constraint allows for fully reconstructing the 3D model of the element. It enables the system to also recover the 3D geometry between different sequences, and handle differences in appearance between different sequences. Exploiting the properties of the 3D structure based alignment allows us to match information in situations which are extremely difficult such as between different video sequences, matching under scale (zoom) differences, under different sensing modalities (IR and visible-light cameras) and so on.

In the case S0 was shot while an element was changing velocity differentially over time & space as in the example of blowing up a hand held air balloon, three options exists as a stand alone or a unified solution. The system can model the balloon with a changing velocity over time and mark the frame or series of frame or the strangely behaving object with the problematic configuration, thus leaving the issue in the time domain. Alternatively, the user can assist the automatic system to define the 3D figure in the frame, thus telling it what 3D information and visual information to use.

At the end of the process the movement of the element may relate the model to its 3D motion capture, using the space dimension in the above image processing adds value in every different frame in the fact that it supplies more 3D and visual information for the reconstruction process for a more accurate 3D model of the object.

The construction of the full 3D figure out of these separate tubes, balls, and other skeleton elements over the time dimension may reveal their mutual behavior—how they are attached to each other, or move together, and may assist in the further animation of the figure.

Once the model has been completed, it can be kept as a separate figure from its origin & background, and can be used for future animation. Its origin movements can be used for motion capture. It may add more visual information from different times or location to the same figure, and can be changed to a new 3D figure depending on the users actions, just as a computer generated image on top of a polygon internal skeleton could be.

Furthermore, the figure becomes independent with respect to the background they had, and can be used for further animation. If the object is photographed or filmed at different times or locations, SP may combine the information obtained from the different times or locations. For example, the visual information may be taken in different times or locations, and the computed information is added to the master 3D model of the figure. Using the 3D structure of the object, we can create animation, mimic face, add voice and so on, at the level of the object itself, with no dependency on the specifically shot background.

The system can also use its ability to capture the motion within moving elements, thus to animate an existing 3D model using motion capture of a full body animation or part of it such as the mimic of the face.

In the case that there are elements that change their relative velocity over both time and space, like blowing up a hand held air balloon in the example given above, the assistance of the user may be needed. The user may be asked to assist the system to define the 3D figure in the frame, to indicate what 3D information the system should use, and whether to leave this figure as a time based sequence, without any attachment of animation. In the latter case, this element may be edited using regular image processing tools. The only difference between the present and the previous example is that the present example remains a time based 3D object and not a space based 3D object.

Image processing tools allow the user to attach together surroundings of different times and locations, correct distortion in the image, remove elements and create new elements based on the information created by the input and also to create 3D computer generated figures or to input computer generated figures from different 3D computer animation programs.

Visual Information

After receiving the three dimensional location in the space based three dimensional model, pending on the determined resolution each point receives visual information layer(s), including the values of color and brightness as recorded in the digital information of the image.

There are several visual parameters to take into consideration. The resolution of the model compared with the resolution of the photographed image, the spherical information of each pixel, and different qualities of the visual information from different cameras or from different clips, etc.

With regards to different image resolution, there may be two cases.

In the first case, the image resolution is higher then the determent resolution of F and thus there is a more than the needed amount of information for every pixel in the 3D model. For example, if the photographed image is 5 times larger in terms of the number of pixels per inch, then the system sums and averages the visual information for every 5 pixels into one pixel and creates a new pixel in the 3D model with the new computed value.

The second case, is where the resolution of the 3D model is larger than the resolution of the photographed image. Using video sequences, every frame generates texture pixels within the frame and if the camera moves a little, pixels will photograph neighboring 3D points enabling to collect more visual information for a unified model then the total amount of pixels in the image. Such a case can happen for example while shooting an image from a distance or using digital zoom and so on. In this case the system extracts the information for each pixel from the neighboring pixels and along the time dimension. Here a key element of multiple layers of visual information for every pixel is crucial and will further be discussed.

New pixels are now created and overlaid on the surface of the model, at the level of the system resolution. Each new pixel, now has a three dimensional position in the 3D space based model, and just as in real life can be observed from the full 360 degrees.

In general, individual pixels are not observed from 360 degrees. For example, a point in a wall may be looked at from 180 degree (the back of the wall has different information in different pixels pending on their 3D location), a corner of a stone is observed from 270 degree, and so on.

Figure 15:
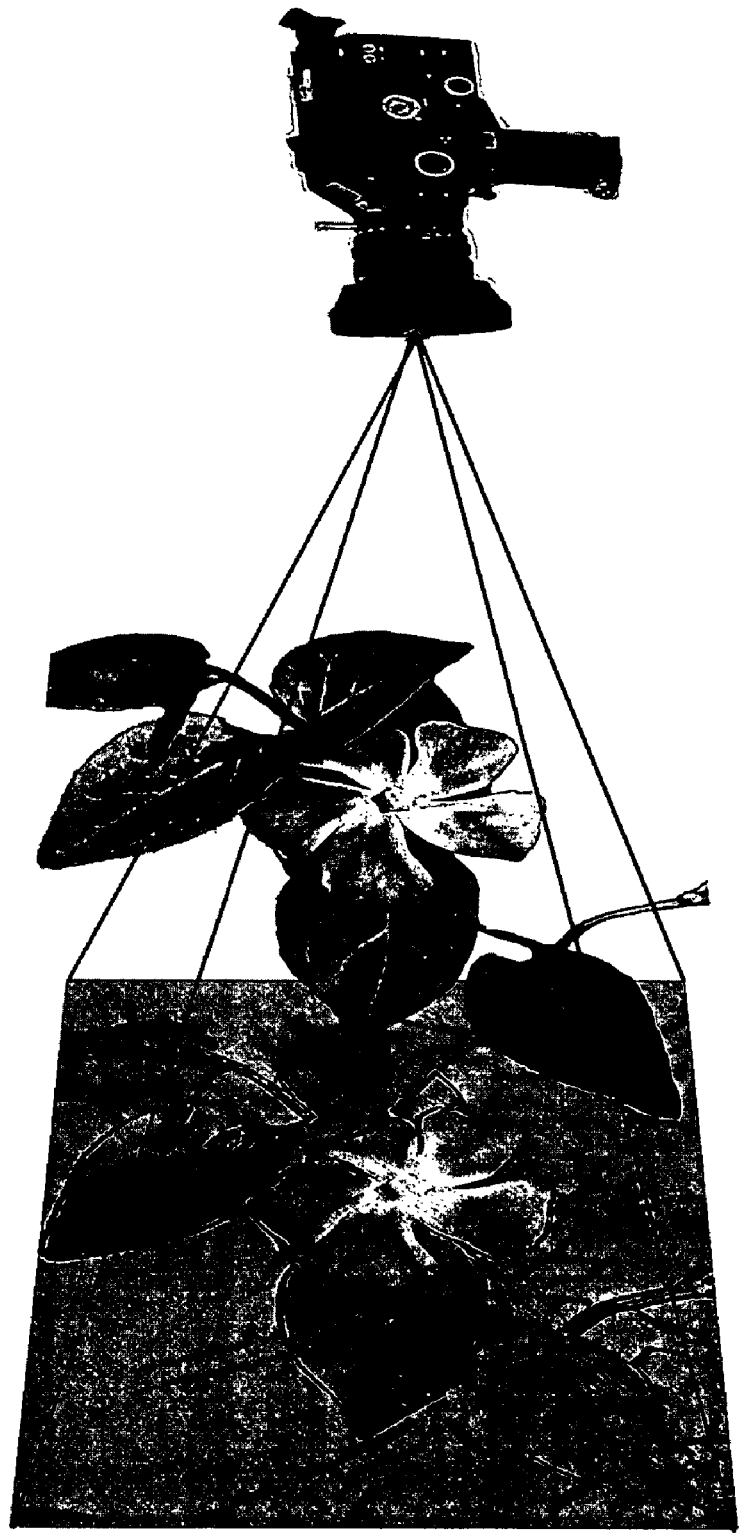
FIG. 15 illustrates a photographed image supplying 3D information from a specific direction.

Reference is now made to FIG. 15 which illustrates a photographed 3D image supplying visual information from a specific direction. Each photographed image supplies visual information from a specific direction. If SP receives visual information of a pixel from a specific direction only, it flattens the pixel, enabling to look at it from 180 degrees. This case creates some distortions in the visual quality when looking at this pixel from a side direction.

A preferred embodiment of the present invention, provides a half spherical pixel formation unifying multiple layers of visual information for each pixel with respect to it's 3D location in the space dimension. It is possible to add infinite number of pixels and in terms of visual quality—we are creating super resolution, The super resolution also relates to the number of depth points it is possible to collect in the unified model creating super resolution 3D points. The depth points allow deformations of the surface in the most accurate way.

In terms of 3 dimensional visual information the more angles that are covered by the visual information provided to the system the better is the ability of the software to mimic the ability to look at the pixel from every needed direction, and the better is the spherical information for this pixel, providing the ability to look at the pixel from every needed possible direction. Thus multiple images may be taken from various angles around the pixel. Every pixel can be photographed in many frames along each clip. Not all of this information is needed, meaning not all this information has the same level of quality. However, recording multi-layered visual information for each pixel may assist in the lowering of computation needed for the image processing and in enhancing the image quality.

In terms of visual quality, every pixel can be photographed in many frames along each clip. Nevertheless, not all of this information is needed as not all the information has the same level of quality. Discarding of low quality information is a point that can assist in the lowering of computation needed for the image processing, but every piece of information is preferably used in order to enhance the image quality due to poor: image quality, lighting, camera resolution and so on.

The system creates a grade of quality Q, where each new layer of information, which mines the information from every new frame is examined as for the quality of its visual information, and resolution. The visual information is graded by two factors, one is the image quality in the time dimension, the second is the image quality in the space dimension.

For example, SP may receive two clips, shot from the same location inside of a building, using different apertures, for photographing the inside of a room and an external garden.

In the first clip the camera uses an aperture with high exposure, this enables the camera to receive good visual information of the interior parts of the image while the external parts of the garden are over exposed and appear in the image as burned or excessively bright.

In the second clip the camera uses a low exposure aperture, this creates very dark visual information of the internal parts of the image, but the external parts of the image are very balanced and well exposed.

Each of these clips may not be well balanced as a stand alone unit, and the histogram of each of them will show unbalanced results.

But, when the system is transformed from the Time dimension where every frame is separately examined in the space domain and the surroundings are examined as a whole, then, as the system receives new visual information it checks the clip based on 2 factors as follows:

a first factor is based on the time dimension, mining the histogram for every frame as a separate unit, and its quality with respect to F, and the second factor is from the space domain in which the already composed images refer to certain areas in the frame to achieve higher quality, even if in F they suffer from poor Q.

The system searches the new clip for better visual quality in the specific parts needed for SP, not in any correlation to the neighboring frame pixels, but with correlation to poor Q of F neighboring pixels, as was explained above with respect to FIG. 14. The system creates a well balanced image that in the present example, gives a very well exposed image that shows the external garden as well as the interior room in the best quality possible as if it where shot using a different aperture at the same time in the same image.

The system regards image information up to a certain minimum level of Q, meaning that if the image is lower then that minimum for both of the two factors above, than there is no point to using this information or to add its values to the existing values of the pixel's texture.

The adding process of the new information is on the basis of Q∈SP, The higher Q will be the higher value of participation that the information has in the pixel value, and the lower Q will be the lower value of participation its information has in the pixel value.

The system unifies the information from both clips to yield a balanced and well exposed view of both the inside of the room and the external garden.

The system may set a threshold for quality Q, and discard visual information accordingly.

The image processing may also include processing methods as those employed by standard camera control units (CCU) in order to balance the image and achieve uniformity between adjacent images.

Viewing

The constructed space based 3D model including its visual information is the collective result captured of all the image sequences is fed to the SP.

Any point in the collective fields can be viewed from any view points using any known in art viewing methods. Following are some examples.

In one embodiment of the present invention, virtual cameras are arranged in such a way that the field of vision of two adjacent lenses is overlapped to a great extent by the fields of view of the two adjacent lenses lying on the lens sides, with respect to a horizontal axis. Consequently, stereoscopic images can be generated.

A preferred embodiment facilitates generation of full time based sequence, Live sequence, non linear output, stereoscopic/3D spherical imaging, and so on.

In a preferred embodiment for providing stereoscopic images, virtual cameras are arranged in a specific configuration, wherein the field of vision of any of the lenses is overlapped to any desired extent by the fields of vision of all adjacent lenses surrounding the lens, the collective field of vision comprises a collection of fully circular images wherein any point within each of the field of vision is captured by at least two virtual lenses for creating a stereoscopic spherical imaging, or from one virtual lenses for creating a 2D spherical imaging, or form at list two virtual lenses for creating a 3D spherical imaging from any view point.

As a result, stereoscopic data can be made available for viewing a scene filmed through a single camera.

The images created by SP can be displayed to a viewer in various formats, such as stills, video, stereoscopic viewing, virtual reality, and so on. The images formed can be displayed on a flat screen such as a TV or a computer screen or by using a display device for virtual reality such as a virtual reality headset, where the part of the image being displayed changes according to the user's viewpoint. Surrounding a viewer, 360 degrees both horizontally and vertically by a suitable means for virtual reality displaying, gives the viewers the ability to look everywhere around him, as well as up and down, while having 3D depth perception of the displayed images.

Virtual reality visual linear and non-linear information is provided to the user, using known in the art virtual reality means. Such means may be a headset having sensors to detect the head position of the viewer, or a virtual glove having a sensor to detect the hand position, or any known in art viewing software.

For displaying on a flat screen, such as a TV or a computer screen, the viewing parameters of a user are taken from a user held pointing device (for example: a mouse or a joystick), programmed for this purpose. The system can gather the user's own movements using this inventions real time motion capture capabilities for example, or any motion capture from any external device.

When a viewer selects a specific view, either by actually turning his head while wearing a virtual reality headset, or by a use held pointing device coupled to a computer device, the viewing parameters are detected and received by the displaying system. The viewer's viewing parameters include the viewer's viewing direction and viewer's horizon. In accordance with these parameters, the viewer's field of vision is determined in terms of the coordinates of the surrounding of the viewer and the image is projected into the viewing means.

Type of Camera(s)

The present invention is not limited with regards to the type of camera(s) used for capturing the images or sequences of images fed to the SP. The camera(s) may be selected from any known in the art digital or analog video cameras. The camera (s) may also be non-digital, in which case any known in the art technique may be used to convert the images into a digital format.

In a preferred embodiment, digital images may be manipulated for enhancing their quality prior to storage and conversion into a spaced based 3D model.

Applications

Figure 10:
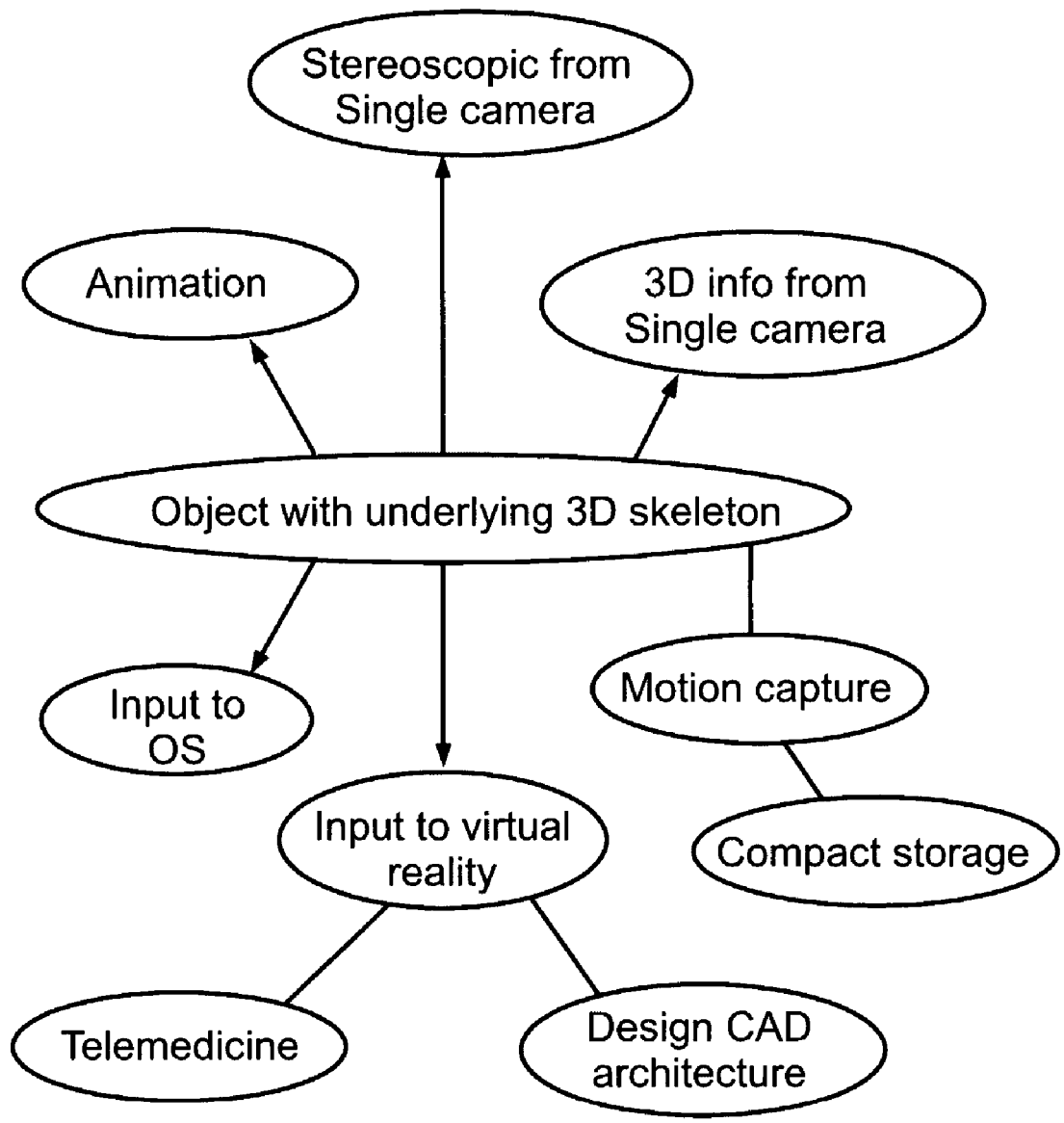
FIG. 10 is a balloon chart illustrating a series of exemplary applications of the present embodiments of the present invention.
Figure 11:
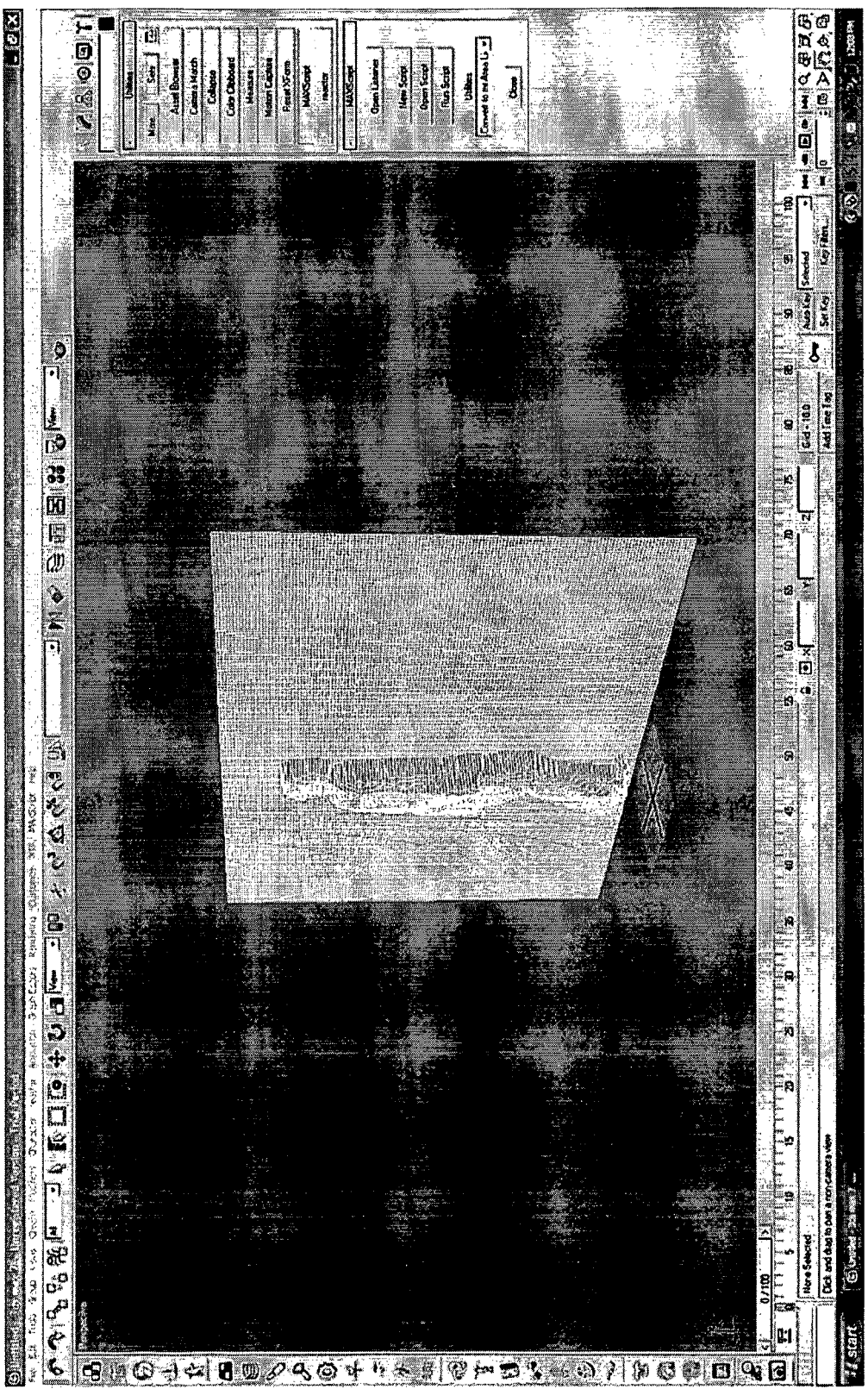
FIG. 11 is a depth map, illustrating possible imaging processes in accordance with a preferred embodiment of the present invention.

Reference is now made to FIG. 10, which is a balloon chart illustrating different applications of the present invention.

According to a preferred embodiment, when a complete space based 3D model constructed as explained above, is available, the user can, within the virtual environment place virtual cameras to in effect re-photograph the scene from view points where no cameras were located in the original sequence. Furthermore this can also be done in real time: For example, in a basket ball game virtual cameras can be placed to shoot the games from view points where there are no actual cameras. All that is needed is to have previously modeled the arena and the individual players. In fact the modeling can be achieved in real time early during the broadcast, as an alternative to doing so beforehand.

According to a preferred embodiment, using the above modeling, each figure once captured from the sequence, can be re-animated by the user, who may also use motion capture for example from an external source or the motion capture of the SP, thus changing how the figure moves in the original clip. That is to say, the user may reconstruct a model from the original photographed image, but output in real time other movements of the figures.

According to a preferred embodiment, the user may modify the original figure from the image or even replace the figure with a completely new manipulated figure.

According to this embodiment, new animation can be given to each figure with no dependency on the original movement of the figure during its photographed clips, by replacing the figure with a 3D model thereof, allowing the creation of new movie clips with the figure itself, using the techniques discussed herein. The figure may also be manipulated in real time by a user in computer games, console games, TV games, etc.

A preferred embodiment introduces new lighting into the 3D model using known in art techniques, for adding light to a scene in animation or during post production of a video clip.

A preferred embodiment comprises depth extrapolation in the arena to any desired point of reference of each element and background, as part of the 3D modeling of the elements and backgrounds. Depth extrapolation comprises a depth map analysis of the sequence(s) of photographic figure input to the system, which can be carried out in a number of ways as will be explained in more detail below.

Preferred embodiments may allow various manipulations such as motion blur on the image.

Using the techniques described herein, all the different kinds of manipulation that can be done while photographing a scene can also be done in the 3D virtual arena, such as changing the focus, modifying the zoom and the lighting, etc.

Using the techniques mentioned herein, the user can create a full motion picture from the figures and backgrounds.

Using the techniques mentioned herein, the user can create a full computer game (console game, TV game etc.) using the 3D space based model where all the figures are real image based 3D models.

Preferably, computer generated images can be added to the three-dimensional environment and three-dimensional models therein. These images can have effects such as altering the skin of the model, adding further computer generated elements to the model or the background and so on According to this embodiment, the user can use the time line information associated with individual figures within the sequences to reconstruct the motion of the figure in a motion capture stage. The present techniques work using a sequence of images from a single camera or from images from two or more cameras.

In the procedure described herein, two dimensional and three dimensional tracking can be applied to any of the figures and backgrounds identified, based on their movements in the time based clips. The tracking can be done in real time, or later as part of re-animating the clips.

According a preferred embodiment of the present invention, the user may also add moving or static elements to the figures or backgrounds in the space based 3D environment.

According to a preferred embodiment of the present invention, the user can create new arenas that were not originally photographed. For example, the user may combine several different surroundings into a unified arena, or combine a photographed arena with a synthetic arena which is computer generated.

According to a preferred embodiment of the present invention, the user can use a figure that is reconstructed using the present embodiments in a 3D model, remove it from its background, and relocate it to different arenas, or to export it to any computer generated program.

According to a preferred embodiment of the present invention, the user can create a new figure based on the reconstructed figures. The user may further add or change her texture, organs, and so on.

According to a preferred embodiment, the user may use existing footage, for example an old movie, and use the data of the movie to model figures and backgrounds of the movie. This may be done by creating a full 3D space based environment or arena of the figures and locations therein, and then create a new movie made from the original figures and surroundings, based on the 3D environment that he has created.

According to a preferred embodiment of the present invention, virtual gathering can be done using virtual 3D replication of the user. Such a virtual gathering may involve motion capture of the user. An application is allowing the user to participate in a virtual martial arts lesson where the teacher can see the 3D figure of the user and correct his movement, and each student may see the other students as 3D figures. The motion capture can be done using the user's own web camera.

Such an application may also be used for additional educational purposes, virtual physical training, virtual video conferencing, etc. The 3D model and motion capture may also be used for virtual exhibitions, multiplayer games, or even virtual dating.

According to a preferred embodiment of the present invention, the space based 3D model may be used in simulation, simulating combat arena for training soldiers, flight simulation, and so on.

According to a preferred embodiment of the present invention, the 3D arena can be used in medical devices. It may be used for manipulating images acquired from one or more sensors. The images may be used to create a 3D model of a body organ for use during an actual surgical procedure in real time or for the purposes of simulation.

The 3D models and environments described herein may be used for planning and design, for example, in architecture and construction engineering.

In one particular application of the present invention, the models and environments described herein may also be used for transition between different video standards, such as between PAL and NTSC.

One application of the techniques provided herein is video compression. In the application, space based 3D modeling using the photographed clip allows for transmission of the model, after which almost all that is necessary is the transmission of movement information. Such a technique represents a large saving in bandwidth over transmission of video frames. for the application is applicable to various uses of video and various quality specifications, from motion picture to cellular video clips.

Furthermore, the present embodiments provide a new method for video recording wherein the recording is directly made into or applied on the 3D space based model of the present embodiments. The video frames themselves can be reproduced after the information has been extracted to the model.

The 3D model of the present embodiments can be used for capturing and modeling moving elements in real time from a single source, and viewing them from any direction. In one application, multiple users at different screens are able to view these figures from any direction or zoom, in real time.

A device according to a preferred embodiment of the present invention system may be used in real time for capturing 3D movement of the user, and using it for fully operating the computer with the 3D movements of hands or body, for any computer program. This implementation may utilize a specified camera, a regular camera such as a regular video camera, a stills camera or a cellular camera. For example, the user may be immersed within a computer game where one of the existing 2D or 3D characters in the game moves according to the movements of the user. This can also be done in the user interface of the cellular mobile phones or any other hand held mobile devices.

According to a preferred embodiment of the present invention, users can model themselves as a full or a partial 3D model and immerse themselves in a computer game or any other relevant computer program Applications of the present embodiments allow for creating of full real image 2D/3D figures and background in computer games, simulators, or any variation of such a platform.

According to a preferred embodiment of the present invention, 3D modeling can be done using any kind of sensor gathered information such as infra red, etc.

According to a preferred embodiment of the present invention, microscopic information can also be modeled into the novel 3D space based model using data gathered from suitable sensors.

According to a preferred embodiment of the present invention, 3D models and texture can be used to create new user defined 2D/3D arena based on data gathered from sensors without optical information, such as subatomic particles, distant stars, or even areas the sensors cannot capture (for example—behind a wall).

According to a preferred embodiment of the present invention, the 3D SP process may be used in machine vision enablement. For example it may be used to provide three-dimensional spatial understanding of a scene to a robot. The robot is thus able to relate to a human as a unified three-dimensional entity and not as a partial image in multiple frames. The resulting robot may have applications for example assisting disabled people and so on.

As needed by the application, the 3D SP process may create a super resolution reconstructed 3D model in terms of the number of texture pixels per inch and number of depth points that construct the 3D formation of the model.

It is expected that during the life of this patent many relevant photography and imaging devices and systems will be developed and the scope of the terms herein, particularly of the terms "3D model", "image capture", "depth map", "Clip", "Virtual Reality", and "Computer", is intended to include all such new technologies a priori.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for estimating 3D coordinates of at least a portion of a human body based on an acquired 2D image of the at least a portion of the human body, said apparatus comprising:
    a structure identifier for identifying structures of the human body within said acquired 2D image; and
    a skeleton model insertion unit adapted to associate elements of a three-dimensional skeleton model with corresponding structures identified within the acquired 2D image, and further adapted to approximate depth information of at least one structure of the human body in the 2D image by imposing as constraints onto the three-dimensional skeleton model spatial relations between identified human body structures in the acquired 2D image.

2. Apparatus according to claim 1, wherein said structure identifier is further adapted to recognize from said 2D image a complex body comprised of a plurality of interrelated human structures.

3. Apparatus according to claim 2, wherein said structure identifier is adapted to recognize a complex body at least partially based on insertion attempts of skeleton model elements from a store of skeleton models.

4. Apparatus according to claim 2, further comprising a movement analyzer unit associated with said skeleton insertion unit, said movement analyzer unit adapted to estimate relative movement of the at least a portion of a human body.

5. Apparatus according to claim 2, further comprising a skeleton store for storing a plurality of predetermined skeleton models for use with complex bodies.

6. Apparatus according to claim 5, wherein said skeleton store further comprises a plurality of interconnected basic-shapes skeleton.

7. Apparatus according to claim 2, further comprising a three-dimensional projection unit for projection from said skeleton elements to a desired plane.

8. Apparatus according to claim 1, wherein said skeleton insertion unit comprises a transformation unit for transforming a skeleton element to fit onto a structure.

9. Apparatus according to claim 1, wherein said skeleton insertion unit comprises a deformation unit for deforming a skeleton element into a structure.

10. Apparatus according to claim 1, further comprising a texture unit for applying texture to a skeleton element.

11. Apparatus according to claim 1, further comprising a tracking unit for tracking respective identified structures at a first level and for moving associated skeleton model elements at a second level.

12. Apparatus according to claim 11, wherein said tracking unit is further configured to track movements of said skeleton model elements at said second level and for inferring structure at said first level.

13. Apparatus according to claim 1, further comprising an animation unit for applying motion to said skeleton elements.

14. Apparatus according to claim 1, further comprising a video recording unit for obtaining frames of 2D image data.

15. Recording apparatus for recording image data with depth information, comprising:
    a structure identifier for identifying structures of a human body within an acquired 2D image; and
    a skeleton model insertion unit adapted to associate elements of a three-dimensional skeleton model with corresponding structures identified within the acquired 2D image, and further adapted to approximate depth information of at least one structure of the human body in the 2D image by imposing as constraints onto the three-dimensional skeleton model spatial relations between identified human body structures in the acquired 2D image; and
    a storage unit for recording the acquired 2D image along with approximated depth information.

* * * * *